United States Patent [19]

Zamora

[11] Patent Number: 4,965,763
[45] Date of Patent: Oct. 23, 1990

[54] COMPUTER METHOD FOR AUTOMATIC EXTRACTION OF COMMONLY SPECIFIED INFORMATION FROM BUSINESS CORRESPONDENCE

[75] Inventor: Elena M. Zamora, Chevy Chase, Md.

[73] Assignee: International Business Machines Corporation, Armonk, N.Y.

[21] Appl. No.: 308,955

[22] Filed: Feb. 6, 1989

Related U.S. Application Data

[63] Continuation of Ser. No. 21,078, Mar. 3, 1987, abandoned.

[51] Int. Cl.⁵ .............................................. G06F 15/40
[52] U.S. Cl. ................................... 364/900; 364/918; 364/963; 364/963.1; 364/419
[58] Field of Search ... 364/200 MS File, 900 MS File, 364/419

[56] References Cited

U.S. PATENT DOCUMENTS

| | | |
|---|---|---|
| 4,358,824 | 11/1982 | Glickman et al. |
| 4,384,329 | 5/1983 | Rosenbaum et al. ............... 364/300 |
| 4,417,321 | 11/1983 | Chang et al. |
| 4,506,326 | 3/1985 | Shaw et al. ......................... 364/900 |
| 4,773,009 | 9/1988 | Kucera et al. ...................... 364/200 |

OTHER PUBLICATIONS

G. E. Heidorn, et al., "The Epistle Text-Critiquing System," IBM Systems Journal, vol. 21, No. 3, pp. 305-236 (1982).

H. Tennant, et al., "Menu-Based Natural Language Understanding," Proc. 21st Ann. Mtg. Assoc. for Computational Linguistics, pp. 151-158, Jun. 1983.

M. S. Palmer, et al., "Recovering Implicit Information," Proc. of 24th Annual Meeting of the Assoc. for Computational Linguistics, pp. 10-19, Jun. 1986.

E. M. Zamora, et al., "Extraction of Chemical Reaction Information from Primary Journal Text Using Computational Linguistics Techniques, . . . " J. Chem. Inf. Comput. Sci., 24, pp. 176-181, 1984.

E. M. Zamora, et al., "Extraction of Chemical Reaction Information" from Primary Journal Text Using Computation Linguistics Techniques, J. Chem. Inf. Comput. Sci., 24, pp. 181-188, (1984).

Primary Examiner—Eddie P. Chan
Attorney, Agent, or Firm—John E. Hoel

[57] ABSTRACT

A Parametric Information Extraction (PIE) system has been developed to identify automatically commonly specified information such as author, date, recipient, address, subject statement, etc. from documents in free format. The program-generated data can be used directly or can be supplemented manually to provide automatic indexing or indexing aid, respectively.

2 Claims, 14 Drawing Sheets

FLOWCHART 1
MAINEXT: EXTRACT PARAMETRIC FIELDS FROM A DOCUMENT

FIG. 3.
FRAME SLOTS FOR BUSINESS CORRESPONDENCE

- DATE OF LETTER
- NAME OF RECIPIENT
- NAME OF SENDER
- ADDRESS OF SENDER
- TITLE OF SENDER
- USERID/NODEID OF SENDER
- USERID/NODEID OF RECIPIENT
- CARBON COPY LIST
- SUBJECT STATEMENT
- REFERENCE STATEMENT

FIG. 5.
LIST OF BUSINESS CORRESPONDENCE CLOSING PHRASES

- REGARDS, BEST REGARDS, WITH REGARDS, WARM REGARDS, ETC.
- THANKS, THANKS IN ADVANCE, MANY THANKS, THANK YOU, ETC.
- SINCERELY
- BYE
- RESPECTFULLY
- VERY TRULY YOURS
- BEST WISHES
- GOOD LUCK

FIG. 4.

TYPICAL BUSINESS CORRESPONDENCE DOCUMENT

```
***************************************************************

HEADING

***************************************************************
Date:   29 June 1984, 15:15:03 GMT
From:   Jan Holen JANHOLEN at OSLOVM
To:     GBGSEC1 at YKTVMT
cc.:    ZAMORA at YKTVMT
Subj:   LEX   project, Norway
***************************************************************

BODY

***************************************************************
Hi,
I need your assistance to make hotel reservations and advice
for the most convenient way to travel from Washington DC
airport to Gaithersburg.

We are two people arriving on Sunday, July 8 with flight No.
TW 749 from J. F. Kennedy.  Arrival time is estimated to be
7:11 p.m.

Our names are:  Jan Holen, IBM Oslo
                Jan Engh, University of Oslo Please make a car reservation at Washington Airport and we
will go by car to Gaithersburg.

Please, make the following hotel reservations:

Jan Holen from July 8 - July 13
            Jan Engh from July 8 - July 20

Please confirm when arranged.

***************************************************************

ENDING

***************************************************************

Jan Holen

***************************************************************
```

FIG. 6.
LIST OF THE HEADING IDENTIFIERS

- REFERENCE, REFERENCES, RE., REF
- SUBJECT, SUBJ.
- TO, MEMO TO, MEMORANDUM TO
- NAME, NAME & TIE EXT.
- FROM
- CC, COPY TO, ALSO TO, CARBON COPY
- USERID, NODEID
- TITLE/DEP. NAME
- ADDRESS, NETWORK ADDRESS, INTERNAL ADDRESS, MAIL ADDRESS
- DATE
- TELEPHONE, PHONE, TEL.
- INFORMATION TO
- MESSAGE FOR
- MESSAGE FROM
- ISSUED BY

FIG. 8.
ENDING EXPECTATIONS

| ENDING SEMANTIC EXPECTATIONS | EXAMPLES OF SYNTACTIC & LEXICAL EXPECTATIONS |
| --- | --- |
| NAME OF SENDER | SIGNATURE |
| ADDRESS | WITHOUT IDENTIFIER |
| TITLE | WITHOUT IDENTIFIER |
| CARBON COPY LIST | CC, CC'S, CC:<br>COPY TO: |
| VNET | HUGHW-STAMIPS<br>GBGSEC5(YKTVMT)<br>GBGSEC1 AT YKTVMT<br>EMZ<br>YKTVMT GBGSEC1<br>GBGSEC1 YKTVMT |

FIG. 7.

HEADING EXPECTATIONS

| HEADING | SEMANTIC EXPECTATIONS | EXAMPLES OF SYNTACTIC AND LEXICAL EXPECTATIONS |
|---|---|---|
| | DATE OF LETTER | FEBRUARY 29, 1984<br>29 JUNE 1984<br>7/30/84<br>85/1/30<br>15.08.84<br>DATE: |
| | NAME OF SENDER | FROM, FROM:<br>NAME & TIE/EXT.: |
| | NAME OF RECIPIENT | TO, TO: |
| | ADDRESS | ADDRESS, ADDRESS:<br>ADDR., ADDR:, ADDR.: |
| | TITLE | TITLE, TITLE:<br>TITLE / DEPT. NAME: |
| | CARBON COPY LIST | CC, CC'S, CC:<br>COPY TO: |
| | VNET | HUGHW-STAMIPS<br>GBGSEC5(YKTVMT)<br>GBGSEC1 AT YKTVMT<br>EMZ<br>YKTVMT GBGSEC1<br>GBGSEC1 YKTVMT |
| | SUBJECT | SUBJECT, SUBJECT:<br>SUBJ., SUBJ: |
| | REFERENCE | REFERENCE, REFERENCE:<br>REF., REF:, REF.: |

DATE SYNTAX DIAGRAM

FLOWCHART I
MAINEXT: EXTRACT PARAMETRIC FIELDS FROM A DOCUMENT

FLOWCHART 2
END DOC: IDENTIFY DOCUMENT ENDING

FLOWCHART 3
HEADDOC: IDENTIFY HEADING OF A DOCUMENT

FLOWCHART 4
HEADING: EXTRACT PARAMETRIC FIELDS FROM HEADING

FLOWCHART 5
ENDING: EXTRACT PARAMETRIC FIELDS FROM ENDING

FLOWCHART 6
ISOLEXT: CREATE FRAME OF PARAMETRIC FIELDS

CONTRUCTING THE DATA BASE

INPUT QUERY TO DATA BASE

FIG. 18.

INVERTED FILE INDEX WITH PIE FRAME CATEGORIES

| Frame Category | Key Words | Doc. No. |
|---|---|---|
| Date: | 841113 | 6a |
| | 831006 | 6b |
| | 850401 | 6c |
| | 841203 | 6d |
| To: | John Blacksmith | 6a |
| | James N. Way | 6b |
| | C. R. Baker | 6b |
| | T. E. Green | 6b |
| | Elaine Martin | 6b |
| | Rick Eagarte | 6b |
| | M. J. Painter | 6c |
| To VNET: | PPPD @ WINTERS | |
| From: | Charles R. Baker | 6a,6d |
| | Michael Smith | 6b |
| | William Sickles | 6c |
| CC: | S. N. Manis | 6a |
| | J. Engleberger | 6d |
| | W. Greenway | 6d |
| | W. S. Miller | 6d |
| | T. Armstrong | 6d |
| Subject: | Overtime | 6a |
| | PPPD Samfarien 1984 TENN Linguistic Support | 6b |

COMPUTER METHOD FOR AUTOMATIC EXTRACTION OF COMMONLY SPECIFIED INFORMATION FROM BUSINESS CORRESPONDENCE

This is a continuation of U.S. patent application Ser. No. 021,078, filed Mar. 3, 1987, now abandoned.

BACKGROUND OF THE INVENTION

1. Technical Field

The invention disclosed broadly relates to data processing and more particularly relates to linguistic applications in data processing.

2. Background Art

Text processing and word processing systems have been developed for both stand-alone applications and distributed processing applications. The terms text processing and word processing will be used interchangeably herein to refer to data processing systems primarily used for the creation, editing, communication, and/or printing of alphanumeric character strings composing written text. A particular distributed processing system for word processing is disclosed in the copending U.S. patent application Ser. No. 781,862 filed Sept. 30, 1985 entitled "Multilingual Processing for Screen Image Build and Command Decode in a Word Processor, with Full Command, Message and Help Support," by K. W. Borgendale, et al., assigned to IBM Corporation. The figures and specification of the Borgendale, et al. patent application are incorporated herein by reference, as an example of a host system within which the subject invention herein can be applied.

Document retrieval is the function of finding stored documents which contain information relevant to a user's query. Prior art computer methods for document retrieval are logically divided into a first component process for creating a document retrieval data base and a second component process for interrogating that data base with the user's queries. In the process of creating the data base, each document which is desired to be entered into the data base, is associated with a unique document number. Then the words comprising the text of the document are scanned and are compiled into an inverted file index. The inverted file index is the accumulation of each unique word encountered in all of the documents scanned. As each word of a document is scanned, the corresponding document number is associated with that word and a search is made through the inverted file index to determine whether that particular word has been previously encountered in either the current document or previous documents entered into the data base. If the word has not been previously encountered, then the word is entered as a new word in the inverted file index and the document number is associated therewith. If, instead, the word has been previously encountered, either in the current document or in a previous document, then the location of the word in the inverted file index is found and the current document number is added to the collection of previous document numbers in which the word has been found. As additional documents are added to the data base, each respective unique word in the inverted file index accumulates additional document numbers for those documents containing the particular word. The inverted file index is stored in the memory of the data processor in the document retrieval system. A document table can also be stored in the memory, containing each respective document number and the corresponding document identification such as its title, location, or other identifying attributes. Typically, prior art techniques for creating a document retrieval data base required a scanning of the entire document in the compilation of the inverted file index. After the inverted file index and the document table have been created in the computer memory, the second stage in the prior art computer methods for document retrieval can take place, namely the input by the user of query words or expressions selected by the user to characterize the types of documents he is seeking in a particular retrieval application. When the user inputs his query words, each word is compared with the inverted file index to determine whether that word matches with any words previously entered in the inverted file index. Upon making a successful match with the query word, the corresponding document numbers for the matched entry in the inverted file index are noted. If additional words are present in the user's input query, each respective word is subjected to the matching operation with the words in the inverted file index and the corresponding document numbers for matched words are noted. Then, a scoring technique is employed to identify those documents having the largest number of matching words to the words in the user's input query. The highest scoring documents can then have their titles or other identifying attributes displayed on the display monitor for the computer in the retrieval system. An example of such a prior art document retrieval system is the IBM System/370 Storage and Information Retrieval System (STAIRS) which is described in IBM publication GH12-5123-1 entitled "IBM System/370 Storage and Information Retrieval System/Virtual Storage—Thesaurus and Linguistic Integrated System," November 1976. Another such system is described in U.S. Pat. No. 4,358,824 to Glickman, et al. entitled "Office Correspondence Storage and Retrieval System," assigned to the IBM Corporation.

Although these prior art document retrieval systems work well, because documents have different topics and are written by different authors at different times, the user may seek only the particular document of a certain author and/or certain subject or date. This retrieval-related information is referred to as the retrieval parameters. This becomes particularly true with business correspondence where the user desiring to retrieve a document may remember only the author, date, recipient, address, subject statement, or other document parameter. It would therefore be desirable to have a document retrieval system which isolates the business correspondence parameters in the process of a data base creation, thereby facilitating the retrieval of business correspondence through the use of queries comprising such business correspondence parameters. The problem of reliably retrieving business correspondence is further compounded when the user compiles a query containing terms which are not exactly the same as the terms in the parameters compiled into the data base during the data base creation phase. It would be desirable to have a document retrieval system suitable for retrieving business correspondence using terms in a query which are different in their linguistic structure, syntax or semantics from the terms employed in the compilation of the data base.

Objects of the Invention

It is therefore an object of the invention to provide an improved document retrieval system.

It is another object of the invention to provide an improved computer method for retrieval of business correspondence.

It is still a further object of the invention to provide an improved business correspondence document retrieval system which is based upon parametric fields which characterize business correspondence.

It is yet a further object of the invention to provide an improved computer method for the retrieval of business correspondence which is tolerant to variations in the linguistic structure, syntactic, or semantic form of the user's input query.

SUMMARY OF THE INVENTION

These and other objects, features and advantages of the invention are accomplished by the computer method disclosed herein. A Parametric Information Extraction (PIE) system has been developed to identify automatically parametric fields such as author, date, recipient, address, subject statement, etc. from documents in free format. The program-generated data can be used directly or can be supplemented manually to provide automatic indexing or indexing aid, respectively.

The PIE system uses structural, syntactic, and semantic knowledge to accomplish its objective. The structural analysis identifies the document heading, body, and ending. The heading and ending, which are the components that contain the parametric information, are then analyzed by a battery of morphologic, syntactic, and semantic pattern-matching procedures that provide the parametric information in standardized forms that can be easily manipulated by computer.

BRIEF DESCRIPTION OF THE DRAWINGS

These and other objects, features and advantages of the invention can be more fully appreciated with reference to the accompanying figures.

FIG. 3 illustrates the frame slots for business correspondence.

FIG. 4 illustrates a typical business correspondence document.

FIG. 5 illustrates a list of business correspondence closing phrases.

FIG. 6 illustrates a list of the heading identifiers.

FIG. 7 illustrates a list of heading expectations.

FIG. 8 illustrates a list of ending expectations.

FIG. 18 is a schematic illustration of a portion of the memory in the computer in which the inverted file index is constructed for document retrieval, using PIE frame categories.

DESCRIPTION OF THE BEST MODE FOR CARRYING OUT THE INVENTION

Introduction

Figure 1:
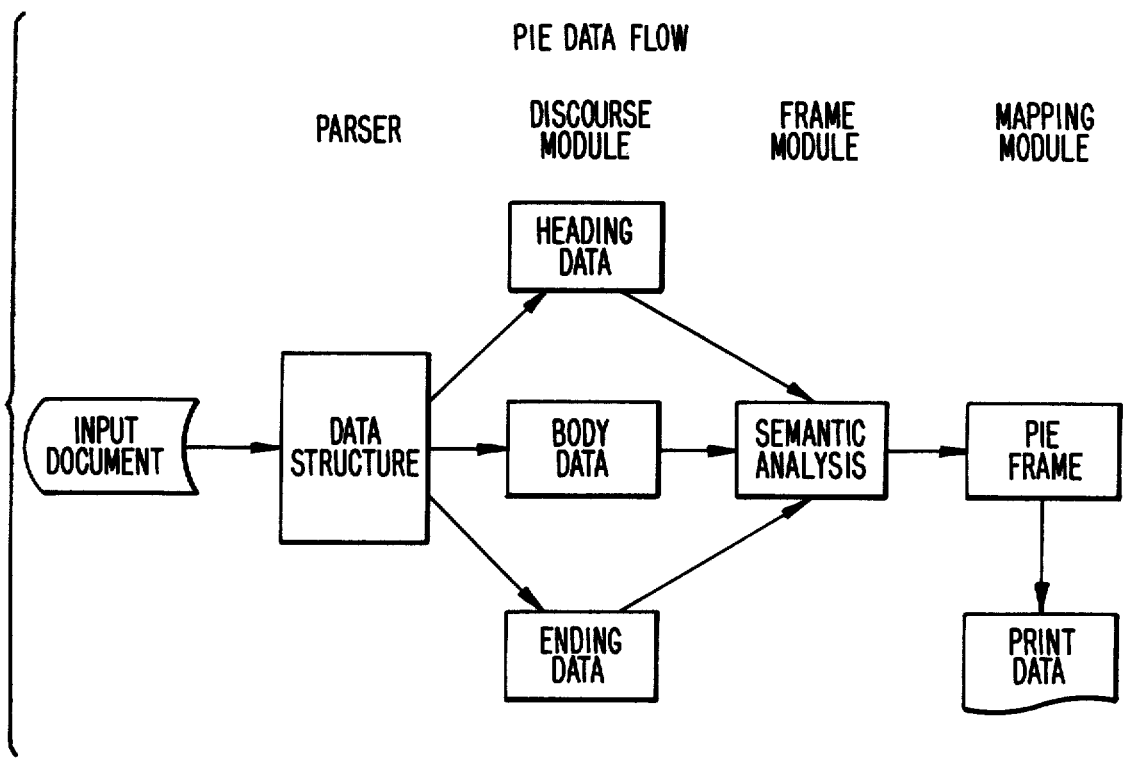
FIG. 1 is a data flow diagram of the parametric information extraction process.

Document retrieval is the problem of finding stored documents which contain information relevant to a user's query. Because the documents have different topics and are written by different authors at different times, the user may seek only the particular document of a certain author and/or certain subject or date. This retrieval-related information is referred to as "parameters." This paper describes a system that isolates certain document attributes and encodes them into a structure for the storing of office document. The structure is suitable to establish a data base that identifies only relevant items for user queries in a regular office environment.

Approach

Although the task of automatically extracting parametric data appears to be well-defined, the problem is difficult because the document format often depends on the whims of the author, the vocabulary is unconstrained, and the contents of the fields to be extracted are unknown. The inventive approach used relies on computational linguistics methods for structural, syntactic, and semantic knowledge. Each English sentence in the office text presented to the PIE system is interpreted via a parser, a discourse analysis procedure, a frame interpreter, and a mapping program that converts the textual information into standard formats.

The structural (discourse) analysis uses a model of the discourse to control the focus of the programming environment for the three identifiable components of business correspondence discourse—the heading, body, and ending of the document. The syntactic analysis (parsing), by contrast, is concerned with the grammatical interpretation of text to determine the parts of speech of the words and the phrase structure of the sentences.

The structural and syntactic information makes it possible to set up a frame work of expectations to drive subsequent field-oriented semantic text analysis. Finally, the actual data extraction consists of mapping the data found in the document to the slots reserved for the data in the output structure. This is a "data cleanup" procedure that standardizes the format of the data as required by the information storage and retrieval programs which use the information.

Syntactic Module

To analyze a sentence of natural language, a computer program recognizes the words and the phrases within the sentence, builds data structures representing their syntactic structure and combines them into a structure that corresponds to the entire sentence. The algorithm which recognizes the phrases and invokes the structure-building procedures is the parser. An example of such a parser is disclosed in the copending patent application Ser. No. 924,670, filed Oct. 29, 1986, entitled "A Parser for Natural Language Text," by A. Zamora, et al., assigned to IBM Corporation, and incorporated herein by reference.

The parser analyzes text for the identification of sentence components including part of speech and phrase structure. It constructs a bidirectional-list data structure consisting of list nodes, string nodes, and attribute nodes. The list nodes make it possible to scan the data structure forward and backwards. The string nodes are attached to the list nodes; they represent each lexical item in the text and contain pointers to the attribute nodes. The attribute nodes consist of an attribute name and a value which may be used to indicate part of speech, level of nesting of a phrase, start of a line, etc. The PIE system accesses the parser's word-oriented data structure through service subroutines to get the lexical items corresponding to the string nodes, and retrieve the attributes associated with them.

Discourse Interpreter Module

Isolation of parametric information depends on the correct identification of the discourse structure in the documents. This aspect of the analysis depends heavily on the format of the document. Most of the information that the system needs is located in the heading and ending of a document. Therefore, specific search procedures concentrate their efforts in these portions of the document.

In the PIE system the HEADING means the top portion of a document before the salutation. It usually does not contain verbs in the sentences (except in the subject or reference statements). The HEADING of a business document contains the date, the names of sender and recipient, the addresses, and the subject statement. It may also contain copy (cc) information, userid/nodeid information, and reference to previous correspondence.

The ENDING is the bottom portion of a business document that contains the signature of the author, but it may also contain carbon copy (cc) information, userid/nodeid information, and sender's address.

The basic purpose of the discourse structure analysis is to obtain and use locative clues that improve the extraction of information. These clues encode knowledge that can direct the programs to examine the locations within the discourse where co-referents (actual data) may be found. Therefore, clear identification of the heading and the ending of a document is very important to eliminate ambiguities. Date information, for example, may be located in the body of a document as well as in the heading, but only the date from the heading portion will be extracted after the discourse interpreter identifies the document structure.

Frame Interpreter Module

The parametric information extracted from the parser data structure is identified and stored in standard formats in the form of frames. A frame provides a set of expectations that have to be fulfilled in particular situations. For our analysis of business correspondence data, the expectations embodied with the frame procedures are that there will be a discourse structure with a heading, body, and ending. Within each of these sections there are additional lower-order expectations. However, these expectations may not always be realized because not every business document contains all these constituents.

A frame defines a chunk of knowledge which is represented by a set of slots and their content. It is exactly these slots that serve to associate the concepts in an organized manner. The PIE frame has a fixed number of categories and a variable number of slots. The categories of this frame correspond to the 10 parameters: (1) date of the letter, (2) name of the sender, (3) name of the recipient, (4) title of the sender, (5) address of the sender, (6) userid/nodeid of the sender, (7) userid/nodeid of the recipient, (8) carbon copy list, (9) the subject statement, and (10) the reference statement. The slots of the frame correspond to each of the above categories, but permit one or more instances of each category to occur. This is important since an unspecified number of recipients, or carbon copy names may exist in a document.

Different types of pattern recognition are required to isolate fields such as addressee or date. The recognition mechanisms for personal names, for example, depends on context (personal titles like "Mr.," "Dr.") or syntactic structure (a prepositional phrase like "to J. Doe"). Dates, by contrast, have more predictable formats and are recognized by application of finite stage procedures which are described by formal languages or syntax diagrams.

Mapping Module

Whereas the frame interpreter module scans the relevant portions of a document in search of data for specific slots, the mapping procedure standardizes the format of the data and organizes it in the slots of the frame. Dates, for example, can be found in both textual and numeric formats in the text of a letter. Also, numeric dates can be in American or European formats. The mapping procedure converts these dates to YYMMDD format, where YY is the year, MM the month, and DD the day. Proper names are also scanned to remove titles such as Mr., Dr., etc. The mapping module fills the slots of the frame for the 10 categories using formal syntactic descriptions of the data to be extracted to ascertain that the format corresponds to what is expected.

The structural information used by the mapping, complements that used during the identification of the fields. The formal syntactic descriptions insure that only the data that is appropriately recognized is placed into the slots of the output frames. The syntactic descriptions, in essence, act as "cleanup" filters that standardize the format of the data selected. Development of a formal description of text requires analysis of a substantial amount of text to produce an accurate and comprehensive description.

General Description

In building a natural language understanding system, programs need various degrees of linguistic knowledge. Therefore, one of the first major decision to be made is how to express and organize the necessary linguistic and conceptual knowledge. The programs to extract parametric information from business correspondence text have to "understand" the material to at least the extent of determining how much of the information in the text is needed to identify parametric information, and translating that information into the appropriate representation in the data base while preserving the meaning.

The PIE system must isolate many different document attributes and encode them into the format or structure suitable for establishing a data base to identify only relevant items for the user queries in the regular office environment. The generated structure must contain all parametric information from a document.

We shall now discuss briefly some aspects of natural language processing in order to provide a little perspective on the subject. Specialized Information Extraction (SIE) systems obtain parametric information from the text and place it in a data base. When we refer to an SIE task, we will mean one that deals with a restricted subject matter; requires information that can be classified under a limited number of discrete parameters; and deals with language of a specialized type. The particular cases of SIE that we have chosen are highly structured business correspondence.

Programs which purport to "understand" some aspects of the language being processed, for whatever purpose, will need various amounts of linguistic knowledge. The degree of linguistic sophistication needed varies with the application. A program for word processing needs essentially no linguistic knowledge, for instance, while a program for producing a word index at least needs to know the definition of a word.

The various levels of linguistic knowledge to build a natural language understanding system are the following:

1. Lexical Knowledge—the words of the language and their individual syntactic properties (their "parts of speech," and often more complex properties, including co-occurrence relations and perhaps lexical decomposition) and meaning.
2. Morphological Knowledge—how the words are modified in shape in particular circumstances (e.g. how plural or past tense are formed).
3. Syntactic Knowledge—how the words are put together to make meaningful sentences.
4. Semantic Knowledge—how the form of the sentences expresses particular meanings.
5. Discourse Knowledge—how sentences are put together to form utterances, i.e. how sentences in an utterance relate to one another, both in forms and content (syntax and semantics).

An understanding of the semantics of the language depends to a certain extent upon lexical, syntactic and discourse knowledge. The lexical knowledge will provide information about the meaning of individual words, and it is then necessary to express how these meanings are put together to form meanings of sentences (or multi-sentence utterances), for each meaningful sentence or discourse in the language. The task of mapping a sentence's form into some representation of the meaning is called the semantic mapping. Of course it is necessary to define some meaning representation before one can do any semantic mapping.

Meaning representation is machine-based data representation designed to provide a means of expressing the meaning of a language. In the fields of Computational Linguistics and Artificial Intelligence "frames" are used to represent knowledge in the format suitable for computer manipulation. Frames serve to simplify the control structure necessary for assigning attributes to conceptual entities. It is the task of semantic mapping to attach each attribute in the corresponding slot of the frame.

In all phrases of language processing, the human listener or reader brings to bear both linguistic and non-linguistic knowledge, and a computational system for language processing must also use both linguistic and non-linguistic knowledge.

One type of non-linguistic knowledge is embodied in what we usually think of as logic—not only the true/false variety, but including things like time relationships and probabilistic reasoning. A second form of non-linguistic knowledge constantly used in dealing with language is empirical knowledge, which consists of facts about the world that are not specifically linguistic or logical.

In this PIE system, the empirical knowledge is in the program in that form of heuristics and assumptions derived from our knowledge of the subject matter of the text. In the semantic portion (which is used to extract the desired parametric information) empirical knowledge is represented in the form of "frames." Although this is not always the sense in which "frame" is used, this is the sense in which we shall use the term in our discussion below: Frames encode non-linguistic "expectation" brought to bear on the task.

Whether one is dealing with a natural language or an artificial one, the extraction of information expressed in specimens of the language is done by analyzing the form of the utterances and proceeding to the meaning, according to the conventions of the language. The conventions that describe the form of possible utterances are called the syntax of the language.

In the PIE program, there are only a finite number of parameters to be determined in a restricted universe of discourse. It is still well to assume that there are an infinite number of ways of expressing in the language the information desired, as both theoretical considerations and experience show that it would be futile to treat the problem in any other way. It is necessary, as always, to deal with these infinite possibilities by finite means through the use of problem segmentation and formal descriptions where applicable.

It is quite possible that some advantage can be gained by first examining in detail the potential input material for its special characteristics. It may be that these special characteristics render the language easier to process. The language may have the regularities that are built into artificial languages to make them easier to process. To cite a particular example, it may be that the name of recipient is always preceded by the preposition "to." Then by looking for a personal name preceded by "to," one would hope to extract a relevant parameter, and also to obtain a piece of information that may help in determining other aspects of sentence structure.

Methods used to obtain information characteristic of the specialized corpus, but which could not be motivated linguistically for the language as a whole are called "ad hoc methods." As with computer methods in general, the "ad hoc" methods may either be algorithmic or heuristic in nature, but they are likely to be the latter. That is, they are likely to be rules-of-thumb, which often, but not always, return an answer (they may even return an incorrect answer on occasion, but if they do this very often, there must be some method to check that answer, or the method becomes counterproductive). If an answer is not returned, then other heuristics are applied, but in some cases, none may work.

The grammar of the system created in this project consists of a lexicon, a syntax, a meaning representation structure, and a semantic mapping. The lexicon consists of the list of words in the language and one or more grammatical categories for each word. The syntax specifies the structure of sentences in the language in terms of the grammatical categories. Morphological procedures recognize the regularities in the structure of words and thereby reduce the size of the lexicon. A discourse structure, or extrasentential syntax, is also included.

To understand the meaning of a sentence in business correspondence text the invention is capable of: parsing the syntactic structure; interpreting each sentence for its discourse purpose; disambiguating the referential terms; and mapping the words of each sentence to a representation used by the programs.

Therefore automatic process of extraction of parametric information from the business correspondence may be split into four major tasks: syntactic analysis of text; structural analysis of text; semantic analysis of text; and semantic mapping procedure.

The establishment of a grammar is one of the fundamental tasks which has to be accomplished before text that exhibits substantial variation, such as natural language text, can be manipulated. The grammar is the basis of the computer programs generated to analyze, or parse, text.

In order to be able to utilize the syntactic structure of a language to determine the structure of individual sentences in a computational system, it is first necessary to formalize the grammar and rid it of any ambiguities, and second, to develop a parser. Therefore, the syntactic analysis task of this project has been concerned with the use of a grammar that adequately describes the business correspondence documents for parsing purposes and parsing algorithms that extract parametric information from business correspondence, implemented in programs.

To analyze a sentence of a natural language, a computer program recognizes the phrases within the sentence, builds data structures for each of them and combines those structures into one that corresponds to the entire sentence. The algorithm which recognizes the phrases and invokes the structure-building procedures is the parsing algorithm implemented in the program.

Along another dimension, language understanding is embedded in a form of discourse. Understanding language involves interpreting the language in terms of the discourse in which it is embedded. Therefore, the semantic analysis of any "understanding" system has to include knowledge for understanding situations, objects and events, and also knowledge about the conventions of the form of discourse.

The role of semantics in language analysis is to relate symbols to concepts. The semantic mapping provides for each syntactically correct sentence, a meaning representation in the meaning representation language and it is the crux of the whole system. If the semantic mapping is fundamentally straightforward, then the syntactic processing can often be reduced. This is one of the virtues of SIE systems; because of the specialized subject matter, the syntactic processing can often be simplified through the use of either "ad hoc" or algorithmic procedures derived from text analysis.

Semantic analysis can be considered to consist of the recognition of references to particular objects or events and the integration of familiar concepts into unusual ones. When language understanding goes beyond the boundaries of single sentences, various linguistic structures are recognized. According to current theories, if a familiar event, such as a document parameter, is described, understanding the parameter description involves recognizing the similarities and differences between the current description and a description of a stereotype of a document parameter.

The complications of automatically extracting information from specialized natural language text require sophisticated techniques, within a methodology that combines linguistic theory and "ad hoc" heuristics (based upon the specialized nature of the material) to provide more satisfactory results than either the application of available linguistic knowledge or "ad hoc" heuristics alone could provide.

One of the problems that has to be confronted in the design of a language understanding system is how to design the system components and their interaction. Thus, identification of the frames that are to be implemented is a very important consideration. For the extraction of parametric information our first impulse might be to define a frame containing the expectations mentioned above: date, name of sender, name of recipient, address, etc. However, consideration of how the parameters found in the text will be used to fill the slots of the frame makes it necessary to take into account the discourse structure of business correspondence text and the semantic content of the information presented. The structure that we call "PIE model" integrates the discourse structure and provides a logical foundation for the design of two procedures: the Discourse PIE Module and PIE Frame.

Each English sentence in office correspondence text presented to the PIE system is interpreted via a parser, a discourse analysis procedure, a frame interpreter, and a mapping program that converts the textual information into standard formats. FIG. 1 illustrates a data flow for the PIE system.

The following paragraphs explain the linguistic techniques and terminology which have been used in this work.

Discourse Analysis

The basic purpose of analyzing the discourse structure is to obtain and make use of locative clues that improve the extraction of information. Stated in another way, knowledge of the context in which specific words occur narrows the scope of their meaning sufficiently to eliminate ambiguities. Discourse analysis, thus, refines specialized information extraction tasks by identifying the heading, body, and ending of each document.

Discourse is any connected piece of text or more than one sentence or more than one independent sentence fragment. In order to interpret discourse it is necessary to: disambiguate the referential terms for their intersentential and extrasentential links; and determine the purpose of each sentence in the discourse.

The purpose of the discourse analysis in the PIE system is to fill slots of frame with values and required information correctly. While the PIE system is designed to understand the English form of business correspondence, the design depends on the method of interpreting the discourse structure of the business correspondence data.

One of the interesting aspects of computational linguistics is that the specific tasks that need to be accomplished to understand text are intertwined so that it is impossible to design a system in a purely hierarchical manner. In the task of extracting parametric information from office correspondence, for example, we can operate most effectively when we have identified the three components of the model in a document: heading, body, and ending. However, the identification and classification of the sentences of the text into these three categories requires algorithmic procedures that have a detailed knowledge of the characteristics of each of the three components.

Figure 2:
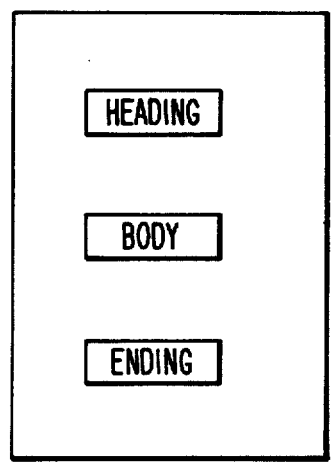
FIG. 2 is a discourse model of business correspondence documents.

An example of the business correspondence discourse model is given in FIG. 2. Because the purpose of the PIE system is to extract parametric information from the heading or/and ending portions of a document, the clear identification of the heading and ending becomes very important to eliminate ambiguities. The discourse model of the PIE system will be discussed later.

Frame Procedure

Frame procedures provide a set of expectations that have to be fulfilled in particular situations. For our analysis of business correspondence data, the expectations embodied with the frame procedures are that there will be a discourse structure with a heading, body, and ending. Within each of these sections there are additional lower-order expectations. These expectations may be the following: date of a letter, name of a sender, name of recipient, title of a sender, address of a sender, and other parameters. There are expectations which may not always be realized because not every business document contains all these parameters.

A frame is defined as a chunk of knowledge consisting of slots and their content. It is exactly these slots that serve the purpose of association links to other concepts. The PIE frame has a fixed number of categories and a variable number of slots. The categories of this frame correspond to the 10 parameters: (1) date of a letter, (2) name of a sender, (3) name of recipient, (4) title of a sender, (5) address of a sender, (6) userid/-nodeid of a sender, (7) userid/nodeid of a recipient, (8) carbon copy list, (9) the subject statement, and (10) the reference statement. The slots of the frame correspond to each of the above categories, but permit one or more instances of each category to occur. This is important since an unspecified number of recipients, or carbon copy names may exist in a document. FIG. 3 illustrates the slots of the PIE frame.

Mapping Procedure

The function of the mapping procedures is to relate symbols to concepts. The PIE mapping procedure converts each specific attribute from the different portions of the document into the corresponding semantic entities needed to file the PIE frame slots.

Whereas the frame interpreter procedure scans the relevant portions of a document in search of data for specific slots, the mapping procedure standardizes the format of the data and organizes it in the slots of the frame. Dates, for example, can be found in both textual and numeric formats in the text of a letter. Also, numeric dates can be in American or European formats. The mapping procedure converts these dates to YYMMDD format, where YY is the year, MM the month, and DD the day. Proper names are also scanned to remove titles such as Mr., Dr., etc.

The PIE mapping procedure for the PIE frame fills the slots for the 10 categories (see FIG. 3). These categories are recognized using syntactic criteria and labeled in the data structure. Since multiple recipients can be specified in a document, the PIE mapping procedure collects them from the discourse of the document, converts them into the standard formats and places them in the PIE frame slot.

Syntactic Module and Use of the Parser

The establishment of the syntactic portion of a grammar is clearly one of the fundamental tasks which has to be accomplished before text can be analyzed linguistically—in particular, before meaning can be extracted. In computational linguistics, this grammar provides a basis for computer programs to determine the structure of the text—the process that we call parsing.

To analyze a sentence of a natural language, a computer program recognizes the phrases within the sentence, builds data structures representing the syntactic structure for each of them and combines those structures into one that corresponds to the entire sentence. The algorithm which recognizes the phrases and invokes the structure-building procedures is the parser disclosed in copending patent application to A. Zamora, et al. entitled "A Parser for Natural Language Text," cited above.

The parser is a deterministic, procedural parser that uses basically bottom-up processing and a multi-pass scanning mechanism. It employs a variety of grammatical analysis techniques. The use of a large dictionary containing all possible parts of speech for each word makes possible the implementation of a novel grammatical analysis called a Complement Grammar.

The parser analyzes text for the identification of sentence components including part of speech and phrase structure. It constructs a bidirectional-list data structure consisting of list nodes, string nodes, and attribute nodes. The list nodes make it possible to scan the data structure forward and backward and have links to the string nodes. The string nodes represent each lexical item in the text and contain pointers to the attribute nodes. The attribute nodes consist of an attribute name and a value which may be used to indicate part of speech, level of nesting, start of a line, etc.

The PIE system accesses the parser's word-oriented data structure through service subroutines to get the lexical items corresponding to the string nodes, and retrieve the attributes associated with them.

The information that the PIE system extracts from the parser data structure is the following: the word itself; syntactic properties (this includes part of speech of the word); morphological properties (such as punctuation marks, numeric data, capitalization information, abbreviation, etc.); sentence delimiter property (this includes colon, exclamation sign, question mark, semicolon, and period at the end of each sentence); personal name property (identifies a personal name); and document formatting property (new line, tabbing, blank lines, etc.).

Pie Discourse Interpreter Module and Discourse Structure of Business Correspondence:

As mentioned earlier, the isolation of parametric information depends on the correct identification of the discourse structure in the documents. This aspect of the analysis depends heavily on the FORMAT of the document, and features such as line spacing and indentation are very important for the correct categorization of the text into heading, body, and ending. The discourse analysis has to take into consideration the fact that there usually are semantic or visual clustering motivations for the wa in which text is placed in separate lines.

The discourse interpretation is done by a program that uses a model of the discourse to control the focus of attention of the programming environment for the three identifiable components of business correspondence discourse structure—the heading, body, and ending of a document.

In the PIE system the HEADING means the top portion of a document before the salutation. It usually does not contain verbs in the sentences (except in the subject or reference statements). The HEADING of a business document contains the date, the names of sender and recipient, the addresses, and the subject statement. It may also contain carbon copy (cc) information, userid/nodeid information, and a reference statement.

The ENDING means the bottom portion of a document that does not contains verbs. The ENDING of a business document contains the signature of the author, but it may also contain carbon copy (cc) information, userid/nodeid information, and sender's address.

The BODY of a business document contains the subject of a document. An example of a business correspondence document is given in FIG. 4.

FIG. 4 illustrates that dates, names, addresses, and other information that may be considered as parameters, may occur either in the heading or ending portions of the document. This is why the PIE system examines the body of the document only for identification of the heading and ending.

The discourse module of business correspondence documents includes five different document structure types illustrated in Examples 1 to 5. These types are:
HEADING—BODY—ENDING STRUCTURE
HEADING—BODY STRUCTURE
BODY—ENDING STRUCTURE
BODY STRUCTURE
SEVERAL HEADINGS AND ENDINGS STRUCTURE Eighty-three percent of the sampled documents had the HEADING—BODY—ENDING structure. The HEADING—BODY structure (no ending) was found in three percent of the documents. Another three percent of the sampled documents had BODY—ENDING structure (no heading). Nine percent of the documents had only BODY (no heading and ending), and one percent of the sampled documents had SEVERAL HEADINGS AND ENDINGS (memo within a memo structure).

The variety of document structures requires first, the identification of the discourse type for each document, and second, the isolation of the components of a document according to its structure.

In our implementation, we used a bootstrapping procedure in which the approximate discourse structure of business correspondence is determined by locating the verbs. This provides the basis for an effective way of identifying the three components of the discourse structure with minimal computational resources. The assumption is based on the fact that neither heading nor ending of a document contains verbs in the sentences, except those that are subject or reference statements.

The identification of the heading and the ending of a document is based on the recognition of the individual lines (records) in a document and not on the basis of the recognition of the complete sentences. The reason for this is that business correspondence documents very often are written incorrectly (people do not put sentence delimiters at the end of the sentences), and the parser cannot isolate sentences properly in these cases.

---

Example 1
HEADING - BODY - ENDING DOCUMENT STRUCTURE

HEADING

To: C. G. Hallenback PPC HQ New York, NY
Date: June 29, 1985
Name & Tie/Ext. Charles R. Baker/333-5465
Title/Dept. Name: Manager/PPC Regional Research Div.
Internal Address: 48-N-99/Clarkstown, NY 09999
or U.S. Mail Address  987 Research Boulevard
Subject: Phasing Out of Non-PPC Workscopes

BODY

Pursuant to our meeting of June 22, 1985, I am putting in place a plan to be in a position to phase out all non-PPC product related and ad tech work by year end 1985. I may look to aid from you on occasion to help in focusing attention of specific product managers on the potential of such an arrangement.

ENDING

C. R. Baker
99L099

---

Example 2
HEADING - BODY DOCUMENT STRUCTURE

HEADING

Date: 6 September 1982, 17:05:13 CET ACK
From: Lynne Jackson 98978765 at GERHANM
Phone: (0)987/0909-7865
BAA Stutamere
Deptmt 9999/999-00
Pascalstr. 900
To: W Ensch HANTAN at YMTBNT
cc: Manvoy MANVOY at YMTBNT
Subject: Dan Schneider

BODY

Dan Schneider sprained his ankle on Saturday and now has his foot put in plaster. As he is somewhat immobile: could you please meet him at the Airport. He will arrive on Wednesday, 8th at 16.00 with 593 (I could not find out what line) coming from New York and supposedly landing in Washington Dulles. You will easily detect him because of the right foot.

---

Example 3
BODY - ENDING DOCUMENT STRUCTURE

BODY

Dan Schneider sprained his ankle on Saturday and now has his foot put in plaster. As he is somewhat immobile: could you please meet him at the Airport. He will arrive on Wednesday, 8th at 16.00 with 593 (I could not find out what line) coming from New York and supposedly landing in Washington Dulles. You will easily detect him because of the right foot.

ENDING

Thanks, John

---

Example 4
BODY DOCUMENT STRUCTURE

BODY

MULTI LAYER THIN TRANSPARENT
OVERLAY DEVELOPMENT PROPOSAL
Conductive surfaces of transparencies register low resolution touch
Mask deposition of conductors on plastic
Less Optical Absorption -continued Example 4
BODY DOCUMENT STRUCTURE
BODY Less Parallax Example 5
SEVERAL HEADINGS AND ENDINGS
DOCUMENT STRUCTURE Charles: This is SLN Translation Class I was talking about yesterday. May I ask your approval and then prepare a letter for Randolph's sign-off.
Thanks, John
Date: 11 May 1984, 18:53:30 SET
From: Jane Casen 07031-17-6267 CNG at SSGVN3
PPDW
7887 Sindelfin
Schwensstr 58-60
To: James Jones (302) 987 5565 HJONE at BENE
cc: Roger Brown BRW at SERBM1
Subject: GOSS participation in SLN translator's class.
A class is scheduled for July 8-9 to acquaint the translators of the ES/654 NMI and documentation with the product and to provide explanation and hints for the use of ES/654 as a translating tool. The class will be held in Bonn and we are beginning the planning now.
Thank you for your cooperation.
Jane One of the assumptions made by the PIE system is that as part of the discourse structure, separate lines are used to start each new section of the document. The body, for example, will never start in the same line as the heading, and the ending will always be in a separate line from the body. END_DOC and HEADDOC therefore identify the records (or lines) where the new sections start. One important feature of the parser is that it keeps information for the starting column of each record and number of blank lines in the document. This helps the PIE system to identify the last record of the heading and the first record of the ending properly from the parser data structure if other explicit discourse clues do not exist.

Discourse analysis is the foundation within which it becomes possible to use "frames" for the extraction of meaning from text. Discourse analysis is the foundation because if the type of discourse is not identified properly, the wrong frame mapping procedures will be applied and the results will be worthless. Just as people can be misled by unexpected clues, computer programs which examine the surface structure of the text to try to classify the discourse structure will make errors under circumstances that have not been anticipated.

Figure 10:
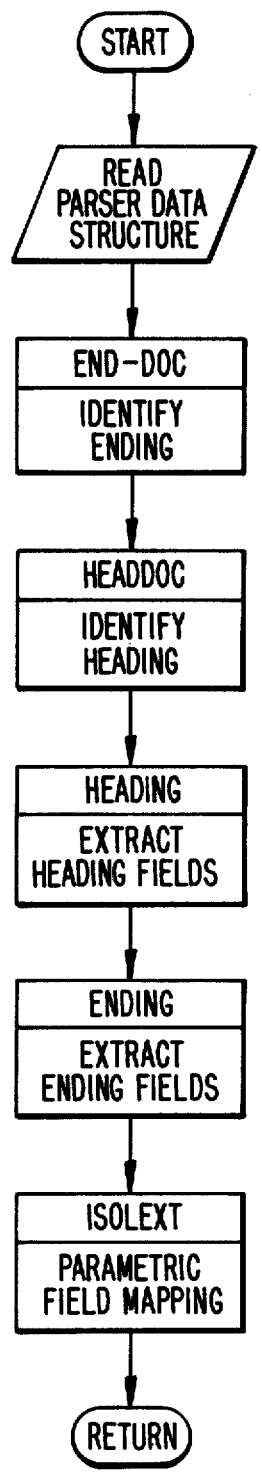
FIG. 10 is a flow diagram of the MAINEXT program which extracts parametric fields from a document.

The PIE programs were developed in PL/1 program languages. They are designed in a modular fashion. The main module MAINEXT coordinates eight external subroutines, as shown in the flow diagram of FIG. 10. MAINEXT first maps the parser data structure into a line-oriented data structure for the document. This data structure references the parser data structure. MAINEXT then calls the modules END_DOC and HEADDOC to identify the ending and the heading of the document, respectively, as shown in the flow diagrams of FIGS. 11 and 12, respectively. The ending identification is done before the heading to simplify further processing due to the fact that parametric information that needs to be extracted from the ending of a document is located before the attachment identifiers (such as "Appendix," "Attachment," etc.) and the identification of these parts in a document allows ignoring them later. The modules HEADING and ENDING are called to identify the lines containing fields for each frame slot, as shown in the flow diagrams of FIGS. 13 and 14, respectively. The rough data extracted by HEADING and ENDING is placed in a temporary structure from which the data is later transferred to the output frame by the ISOLEXT mapping procedures, as shown in the flow diagram of FIG. 15. The flow charts for these modules are given in FIGS. 10-15.

The documents in business correspondence have many different formats (memo format, message format, etc., as shown in Examples 6a-d, 7a-c, 8a-c, 9 and 10). The discourse structure identification depends on the syntax of the document and on the kinds of frame slots they contain. The ending identification algorithm (END_DOC) mostly depends on the syntax of the document (part of speech and sentence delimiters). The context of the endings of the documents usually varies only in the number of frame slots (it may contain only signature, or some other information). The headings of the documents vary not only in the number of the frame slots but also on the standard format representation of the business correspondence parameters depending on the standard written procedures.

Example 6a
TYPE 1. MEMO FORMAT
MEMO1 FORMAT

To: John Blacksmith GED Bethesda
Date: November 13, 1984
Name & Tie/Ext.: Charles R. Baker/654-2315
Title/Dept. Name: Manager/PCW Research Department
Internal Address: 53-N-36/Clarkstown, NY 08797
or U.S. Mail Address: 536 Parker Road
Subject: Overtime
Per my earlier conversations with Ted Thompson, I am addressing the overtime problem of Carol Daley and Margaret Amos. It is likely a third secretary will be hired.
C. R. Baker
cc: S. N. Manis

PIE RESULTS

DATE:
841113
TO:
John Blacksmith
FROM:
Charles R. Baker
CC:
S. N. Manis
TITLE:
Manager/ PCW Research Department
ADDRESS:
53-N-36/Clarkstown, NY 08797 536 Parker Road
SUBJECT:
Overtime Example 6b
MEMO2 FORMAT
1. STANDARD VNET FORMAT Date: 6 October 1983 15:33:11 SET
From: Michael Smith 7034-35-3624 MHL at SMEVM1
PPPD Dondelner, Germany
Product Management
Bldg. 9862-86, Dept. 0078
To: James N. Way (335)931-3521 GHEYG at HJTVME
C. R. Baker GGHEYU1 at YTYVME
T. E. Green GREENTE at TYEVME
Elaine Martin 331-523-924-5221 ELIN at YKEVME
Rick Eagarte EAG at EKTVME
SUBJECT: PPPD Samfarien 1984 TENN Linguistic Support

Example 6b
MEMO2 FORMAT
1. STANDARD VNET FORMAT

Reference: Your message to Eagerte/Spehtt, Same Subject, 12/30/83
E. Martin's note, 1984 German Language Support, 12/04/83
Our Plans & Control department will contact your Financial department to clarify the ICA procedure.
Regards,
Michael Smith
Prod. Mgr.
PPPD New Britain

PIE RESULTS

DATE:
831006
TO:
James N. Way, C. R. Baker, T. E. Green, Elaine Martin, Rick Eagarte
TO_VNET:
GHEYG @ HJTVME, GGHEYU1 @ YTYVME, GREENTE @ TYEVME, ELIN @ YKEVME EAG @ EKTVME
FROM:
Michael Smith
FROM_VNET:
MHL @ SMEVM1
ADDRESS:
PPPD Dondelner, Germany Product Management Bldg. 9862-86, Dept. 007
SUBJECT:
PPPD Samfarien 1984 TENN Linguistic Support
REFERENCE:
Your message to Eagarte/Spehtt, Same Subject, 12/30/83 E. Martin's note 1984 German Language Support, 12/04/83

Example 6c
2. NON-STANDARD MEMO FORMAT

April 1, 1985
To: M. J. Painter
I have sent an edited version of my memo to file dated April 4, 1985. Some errors and syntax have been corrected.
PLEASE NOTE THAT I AM SENDING IT AGAIN.
William Sickles

PIE RESULTS

DATE:
850401
TO:
M. J. Painter
FROM:
William Sickles

Example 6d
3. ITPS MEMO FORMAT

ITPS MSG UNCLS PPDC NOCC MSG MAIL
To: PPPD - WINTERS
From:   GEESEC1(HIEVMT) 84/12/03 18:20:23
        ITPS: AFSD
In response to your telex of October 21, 1983 it is my understanding that Product Assurance is your responsibility both funding and negotiation. The longer you delay the more impossible it will become to meet committed dates due to Assurance non involvement.
Charles R. Baker
cc: J. Engelbarger
    W. Greenway
    W. S. Miller
    T. Armstrong

PIE RESULTS

DATE:

Example 6d
3. ITPS MEMO FORMAT

841203
TO_VNET:
PD @ WINTERS
FROM_VNET:
GEESEC1 @ HIEVMT
CC:
J. Engelberger, W. Greenway, W. S. Miller, T. Armstrong

Example 7a
TYPE 2. MESSAGE FORMAT
MESSAGE FORMAT 1

MSG DTHOMAS-ASWEM TO:     GEY341-RTEYNT 09/17/84 14:13:42

Subject: SEBOST
Joan,
   Two people have dropped out from the group due to visit you on Tuesday Oct 25.
Walter Spencer, UM Representative, International Sales, TEC
653 Hamilton Street, Neward. 8-643-6321 DTHOMAS at ASWEM
SEBOST

PIE RESULTS

DATE:
840917
TO_VNET:
GEY341 @ RTEYNT
FROM:
Walter Spencer
FROM_VNET:
DTHOMAS @ ASWEM
SUBJECT:
SEBOST

Example 7b
MESSAGE FORMAT 2

MSG:0002 08/08/85-17:12:14 A To:YJHGTE GECEGA1
From:RGEWMV RJF
    Janice, don't worry about resending any letters. Perhaps you can keep the problem in mind for the next time you send. We're just rookies out here in the plains, and we haven't mastered VM yet. So be patient. It was nice of you to reply.
        Dave Lingeran RGEWMV at RJF
        DEPT 42W/053-1
        Rochester, MN 8-321-5165

PIE RESULTS

DATE: 850808
TO_VNET:  YJHGTE @ GECEGA1
FROM:   Dave Lingerman
FROM_VNET:   RGEWMV @ RJF

Example 7c
MESSAGE FORMAT 3

*Forwarding note from ETH01-EWTS1VM 04/27/84 11:31*
To: HUGFS-SNATIMS
FROM:   W. H. Reed 8-321-5276
        87 South Broadway
        Brooklyn, N.Y. 10441
SUBJECT:  Smart Cards
RE:   "The Nilson Report." Issue 333, June 1983, pa. 5, top
The referenced pub reports on the use by Rexroth of microwaves, rather than metal contacts, to communicate between a smart card and a terminal.
William

PIE RESULTS

DATE:   840427
TO_VNET:   HUGFS @ SNATIMS

-continued

Example 7c
MESSAGE FORMAT 3

FROM: W. H. Reed
FROM_VNET: ETH01 @ EWTS1VM
ADDRESS: 87 South Broadway Brooklyn N.Y. 10441
SUBJECT: Smart Cards
REFERENCE: "The Nilson Report," Issue 333, June 1983, pa. 5, top

Example 8a
TYPE 3. GENERAL DISTRIBUTION MEMO FORMAT
1. MANAGEMENT BRIEFING FORMAT Corporate Headquarters
August 7, 1975
Memorandum to Managers
Subject 1975 Employee Benefits Statement
The CDI stockholders have approved the proposed changes to the CDI Retirement Plan. The 1975 employee benefits statements will be mailed to employees very shortly. They will reflect estimated retirement income based on the improved Plan, as well as benefits under the other CDI plans.
W. T. Cranford

PIE RESULTS
DATE: 750807
TO: Managers
FROM: W. T. Cranford
SUBJECT: 1975 Employee Benefits Statement

Example 8b
2. CHAIRMAN'S LETTER

Chairman's Letter
THINK-August, 1973
Fellow Colleagues:
We cannot safeguard the essentials of our businesks unless each of us makes security his or her personal responsibility.
I ask your continuing understanding, and vigil.
Art Palmer

PIE RESULTS
DATE: 730800
TO: Fellow Colleagues
FROM: Art Palmer

Example 8c
3. LETTERS TO MEMBERSHIP OF PROFESSIONAL SOCIETIES

June 26, 1985
TO: UED Board Members
FROM: F. R. Rhinehart
D32/382
Houston
SUBJECT: July UED Board Meeting
The July UED Architecture Review Board Meeting is being rescheduled from July 29, 1985, to July 30, 1985.
F. R. Rhinehart
cc: T. G. Pope, D33/842, Houston
D. B. Olds, D43/304, Houston DATE: 850626
TO: UED Board Members
FROM: F. R. Rhinehart
CC: T. G. Pope, D. B. Olds
ADDRESS: D32/382 Houston
SUBJECT: July UED Board Meeting

Example 9
TYPE 4. INFORMAL LETTER FORMAT

Barb,
Please ignore the first copy of the v-net since I made some corrections after I first sent it.
Thank you.
Beverly

PIE RESULTS
TO: Barb
FROM: Beverly

Example 10
TYPE 5. MISCELLANEOUS BUSINESS DOCUMENTS

DIRECTIONS: National Airport to I-270
1. When leaving National Airpot, follow signs for I-395 North. This will put you on a highway.
2. Stay on the highway, past the exit for I-395 North.
3. Stay on the highway, past the exit for I-395 South.
4. The highway will fork. Stay to the right, following the sign that says "Parkway (Dulles Airport)." This will put you on the George Washington Parkway.
5. Stay on the Parkway for about 10 miles.
6. Take the exit marked "to I-495 (Maryland)." This will put you on I-495.
7. Stay on I-495 for about 5 miles. The highway will fork. Stay to the left, following signs for I-270 (Rockville, Frederick).

PIE RESULTS
NO PARAMETRIC INFORMATION IS EXTRACTED

Identification of the Document Ending:

Business correspondence text can be split into two different types of a document format: letter-type and table-type. The body of the letter-type documents usually consist of complete grammatical sentences. The letter-type document format is illustrated in FIG. 4. Eighty-nine percent of the 500 sample documents represent the letter-type formats.

Table-type documents usually do not consist of complete grammatical sentences, but contain tables, agendas, lists of personal names, etc. For example:

| AGENDA | |
|---|---|
| 9:30 a.m. | OVERVIEW |
| | MISSION |
| | ACTIVITIES |
| 10:00 a.m. | REFRESHMENT BREAK |
| 10:15 a.m. | Group A Group B Group C |
| 10:45 a.m. | Group C Group A Group B |
| 11:15 a.m. | Group B Group C Group A |
| 11:45 a.m. | ASSEMBLE AND TRANSPORT TO RESTAURANT |
| 12:15 p.m. | LUNCH |

This type of document does not generally contain verbs. Eleven percent of the 500 sample documents comprise the table-type formats.

Documents of mixed format that contain both letter and table-type information also may occur in business correspondence text. If complete grammatical sentences are located before the table, then the PIE system considers this as a table-type document. If the complete sentences are located after the table in the bottom portion of a document, the document is considered as a letter type.

Identification of the ending of a document in the PIE system is done by the END_DOC procedure (see flow chart in FIG. 11) before the heading is identified.

The procedures to identify the ending in these types of a document format differ substantially. The letter-type ending identification procedure locates the last verb and complimentary close words such as "regards" and "sincerely" in the bottom portion of the document. The portion of the document that does not contain verbs and located after the above-mentioned clues is considered to be the ending of a document by the PIE system. If such clues are not found in the letter-type document and the last sentence contains either an article or a verb, the discourse structure for this document does not contain any ending.

It is more difficult to recognize the table-type document format. In this format the signature can be the only clue for identification of the ending in the document. If the document is in the form of list of personal names, the procedure to differentiate personal names in the body of a document from the signature becomes very complicated.

In the case when no ending discourse clues such as "Attachment," "Appendix," etc. are found, the program looks for the last verb in the document, and then for the first period after the sentence with a verb. The assumption is made that the ending usually does not contain verbs. Because there are two different types of document formats, the first task is to recognize the type of document format. If the document is of letter type, then if the last sentence of a document contains a verb and a period, the document has no ending.

Figure 11:
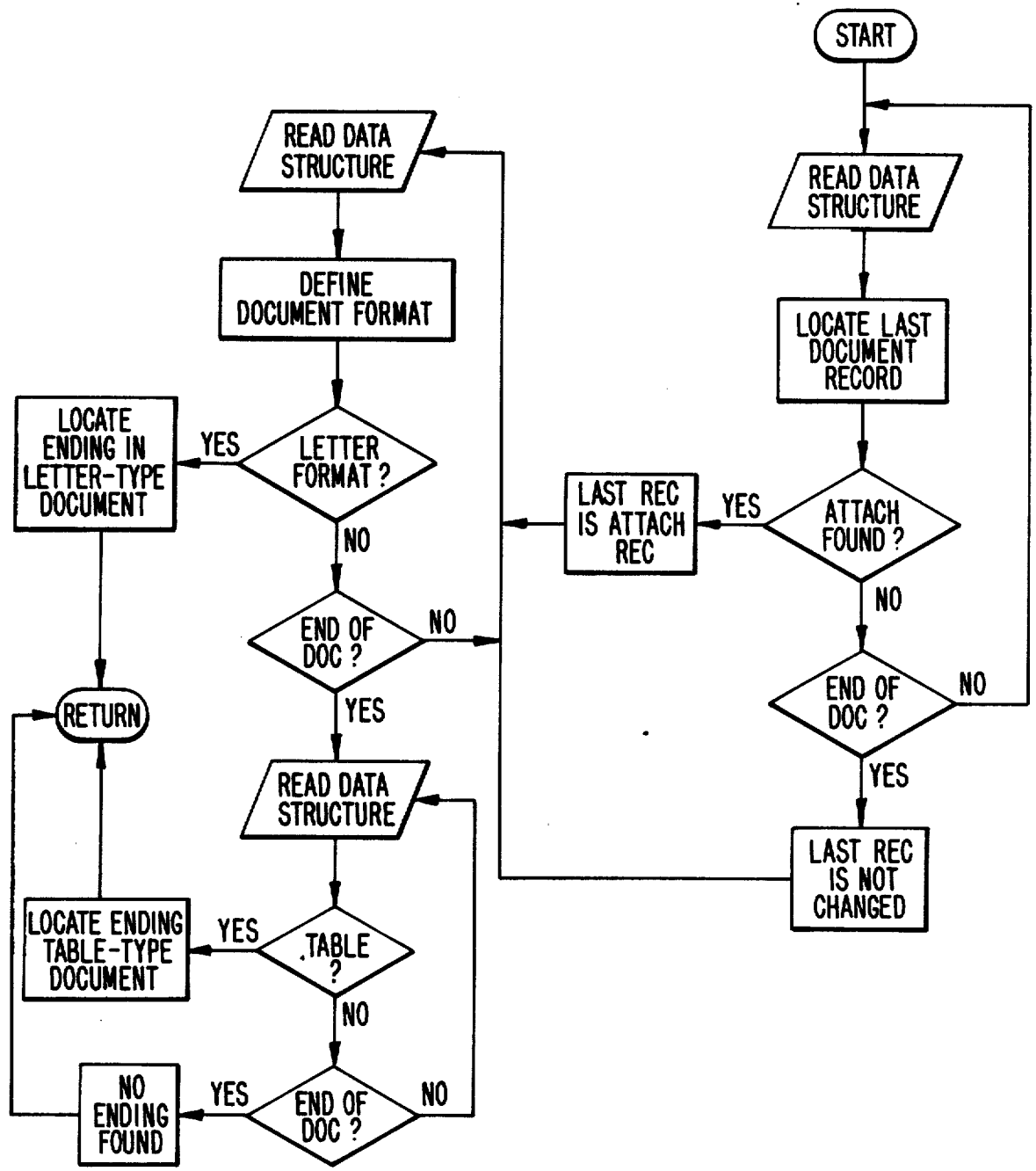
FIG. 11 is a flow diagram of the $END_{13}$ DOC program which identifies document endings.

END DOC Procedure:

END_DOC makes three passes through the data structure to identify the ending of the document, as shown in FIG. 11. In the first pass the program looks for clues that identify the ending of documents such as postscripts, appendices, attachments, etc. scanning from the front to the back of the document. The reason why the first pass through a document is done from the beginning of a document is that usually the appendix is much longer than the body of a document. If an appendix or other attachments are found by the first pass, the record preceding the attachment becomes the last record of a document for further processing. In the second pass, END_DOC scans from the back to the front of the document looking for the delimiters marked by the parser (period, exclamation, etc.) to locate the last verb. The verb generally identifies the last sentence of the body (letter-type document format). The third pass, also front-to-back, is only used when the preceding two passes fail to identify the ending; this happens mainly when the body of the document consists of a table, a list of names with telephone numbers, or other unusual circumstances (table-type document format). The document has no ending if all three passes fail.

The END_DOC procedure scans the parser data structure and creates a line-oriented data structure to refer to the formatting information for each document line. END_DOC examines the words and their properties (such as syntactic information, sentence delimiters, punctuation information, and proper name information) to identify if the document contains postscript, attachment, appendix, or agenda information. If one of these identifiers is found, it re-assigns the last record of a document to the record preceding this information and ignores the rest of the document. Once the last record of the document is defined, the procedure identifies the document format, and then analyzes the letter-type and table-type documents respectively back-to-front to locate the ending.

To identify the document format the END_DOC procedure scans from the end to the front of the parser data structure until a sentence delimiter is found. If a sentence delimiter is not found in the document, the program makes a decision that this is not a letter-type document format. This means that there is no ending in the document or that the document is in table format (that also may contain an ending or may be without ending). If no ending was identified, the END_DOC procedure makes a decision that the discourse structure of this document does not contain an ending. If the ending in the table document format is not found because of a failure of the procedure, the information from the ending of this document is lost. This does not create a problem because the table-type document usually contains only a signature in the ending, and if the heading is recognized, the signature is a redundant parameter. The signature is important to identify the name of the sender. It is valuable only if the heading of a document is not found and the signature is the only source for the sender's name. In most cases the table-type documents do not contain ending in their discourse structure.

END_DOC checks for closing expressions such as "Regards," "Sincerely," etc. after the sentence delimiter to identify the letter-type ending. The list of closing expressions used for the ending identification is given in FIG. 5. If one of these expressions is found in the record, this record becomes the first record of the ending. If no closing expressions are found, the program checks to see if the record with the sentence delimiter contains verbs or articles. If they are found, it continues scanning until verbs or articles are not found. The first record without verbs or articles becomes the starting record of the ending.

As shown in FIG. 4, the sentence "Please confirm when arranged." contains both a sentence delimiter and verbs. The procedure checks the next record "Jan Holen" and because it does not contain either a sentence delimiter or a verb, and it is the last record in the document, the program identifies it as the start of the document ending.

When a verb is not found, the program analyzes one previous line for verbs or articles. It could happen that the record does not contain verbs because it is a continuation of the previous record. For example, the document may end with the following three records:

Please make a car reservation at the Washington airport and we will go by car to Gaithersburg.
Jan Holen In this case, the line with the last period does not contain any verbs. The procedure will check the previous line and recognize that the current line is a continuation of the previous one. If verbs are not found in all the previous records, the program makes a decision that the document is not in the letter format and returns to the calling procedure.

If a verb is found, it checks for the sentence delimiter in the previous record, and if the latter is found, identifies the ending. If a sentence delimiter was not found, the program examines if the current record is an independent record or the continuation of a previous record (it also could happen that the author of the letter forgot to put a sentence delimiter at the end of a record).

In the last step the program identifies the table-type ending if the letter-type format is not recognized using the signature information.

Figure 12:
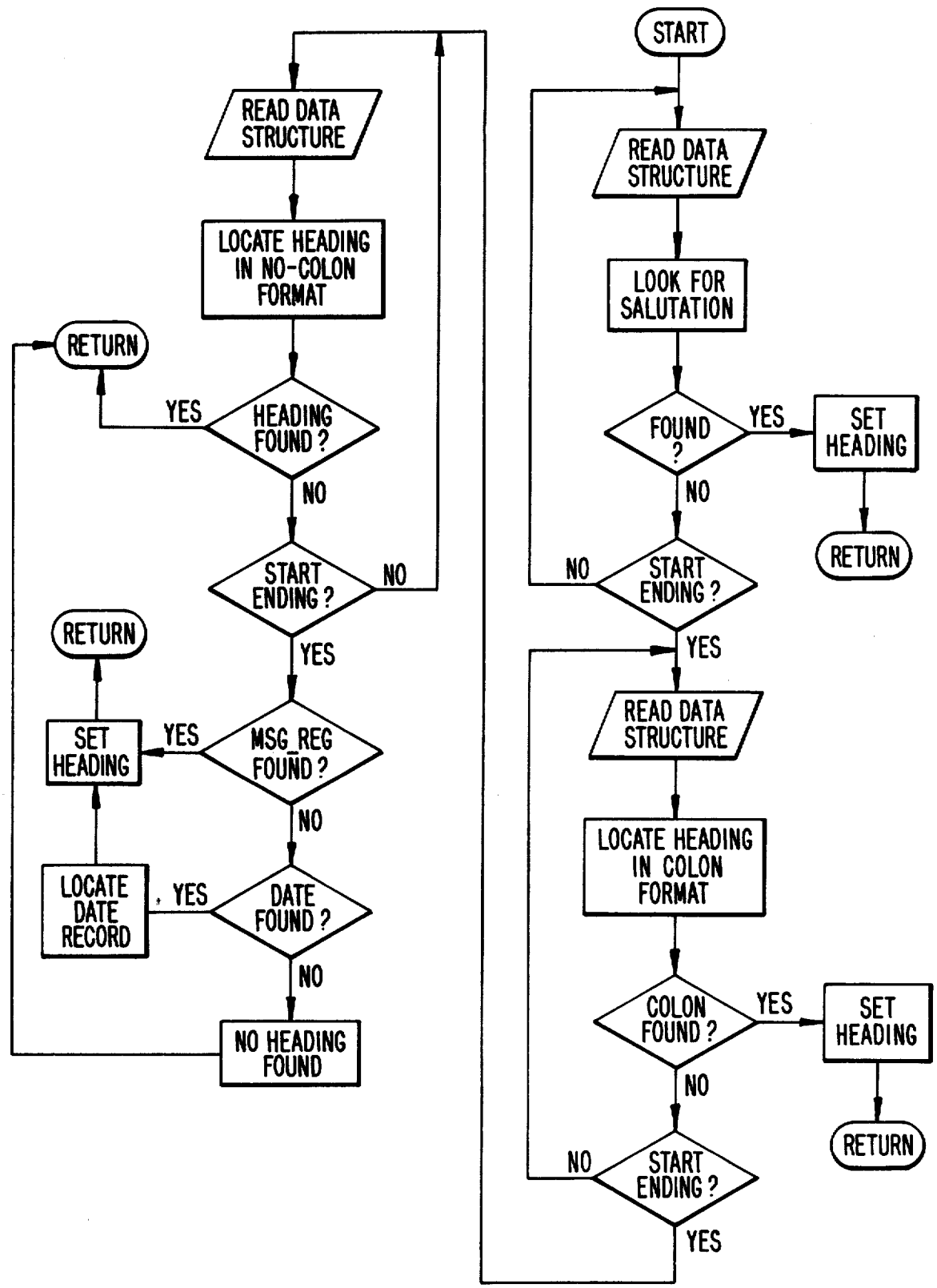
FIG. 12 is a flow diagram of the HEADDOC program which identifies the heading of a document.

Identification of the Document Heading:

The algorithm in HEADDOC, shown in FIG. 12, for identification of the heading of a document differs from the ending identification algorithm because it does not rely on the syntactic information of a document. The heading identification procedure processes both letter-type and table-type document formats in the same manner. The business correspondence document headings vary widely in formats. The heading identification algorithm recognizes five major heading formats (these are illustrated in the Examples as follows).

1. MEMO format (Examples 6a–d)
2. MESSAGE format (Examples 7a–c)
3. GENERAL DISTRIBUTION MEMO format (Examples 8a–c)
4. INFORMAL LETTER format (Example 9)
5. MISCELLANEOUS BUSINESS DOCUMENTS (Example 10)

Example company internal mail formats follow the MEMO format. The heading contains standard slot identifiers for sender, recipient, date, address subject, and reference. Another category of MEMO format includes informal memoranda transmitted via the system. Standard VNET electronic mail messages including NOTE, MAIL, etc. are distinguished by the consistent formats of identifiers in the headings and the presence of user IDs in the recipient and sender slots. Nonstandard memos include all inter-office memoranda for which one of the standard VNET formats was not used, or was substantially modified by the sender. Most of the frame slot identifiers are located in the headings, but their syntax varies considerably. VNET is an IBM virtual machine subsystem for VM/370, which manages the transmission and reception of data between a VM/370 system and other IBM System/370 computers operating in a Network Job Interface communication network. (See IBM publication SH20-1977-0 "VM/370 Networking—Program Reference and Operations Manual."

In the MESSAGE heading format the first record of the heading is usually formatted as illustrated in Examples 7a–c. In addition to the identifiers in the MESSAGE record, the heading may also contain standard identifiers for sender, recipient, and sometimes subject, reference, or cc.

The GENERAL DISTRIBUTION MEMO group includes Management Briefings, Chairman's Letters, and memos for distribution to membership of professional societies. All of them have a standard format, therefore they are easily recognized.

The INFORMAL LETTER heading format of a document groups informal office communications. They are usually very brief, and have no identifiable heading. The first name of the addressee is usually the first word of the document.

The MISCELLANEOUS BUSINESS heading format represents a group of unclassified documents such as draft memos, lists, contracts, agendas, and tables and charts.

The discourse clues which are used by the PIE discourse interpreter module differ for each of these format types and they are highly specific for the heading identification.

The heading identification is done by the HEADDOC procedure (see flow chart in FIG. 12) after the ending is identified. Most of the business correspondence documents contain either salutations in the beginning of the body, or sender, recipient, and subject identifiers in the heading portion of a document. If they are not found, the first sentence with a verb identifies the beginning of the body and the previous sentence is the end of the heading. Otherwise, the document has no heading.

HEADDOC Procedure:

HEADDOC also consists of three passes through the data structure, as shown in FIG. 12. The first and the third pass are from the beginning of the data structure to the ending of the document as marked by END_DOC. The second pass is back-to-front from the ending record of the document as marked by END_DOC. In the first pass, clues such as "Dear" and other salutations are located. The second pass looks for punctuation clues to locate explicit heading words such as "To," "From," "Subject," etc. The third pass is used if no punctuation clues are found, and relies on locating heading words without the characteristic punctuation or verbs. If all three passes fail, no heading is identified.

The HEADDOC procedure scans the parser data structure and isolates words and their properties for each heading line. Then it searches for the salutation heading identifiers. The salutations used for the heading identification are:

DEAR
MR, MRS, MS, DR.
HI
HELLO

If one of those salutations is found the program sets the record preceding the salutation record as the last record of the heading. For example, the following letter contains the salutation clause "Dear Charles."

```
Date:    14 March 1985, 08:41:54 CTT
To:      Charles Baker 00.1.202.445.6667 CHART88 at NMEBTT
From:    G. Smith
         J. Doe
Dear Charles,
Sorry to come back to you so late. I want to thank you again
and your people for your warm and friendly welcome.
Warm regards
Michael
```

In this case all the records preceding the salutation clause are assigned to the heading of this document.

If salutation expressions are not found, the procedure examines the format of the heading using the heading identifiers such as "TO," "FROM," etc. and their context and identifies the last record of the heading of a document for each format. The complete list of the heading identifiers used by this program is given in FIG. 6. The heading identifiers usually follow by punctuation such as colon or arrow (":," "→"). The program scans the parser data structure from the end of the document marked by END_DOC looking for the last colon or arrow before the body of a document. If one of those punctuation marks is found, it checks to see if the heading identifiers precede the punctuation. In the example above, if the letter does not contain the salutation "Dear Charles," the record "FROM: G. Smith" will be recognized as the record with the last colon before the body. But this record is not the last heading record because it has a continuation on the next line. Attention is paid to the specific ways in which data is continued implicitly from one line to the next by the use of indentation as illustrated in the example above:

FROM: G. Smith
J. Doe

The procedure examines the next lines for continuation to locate the last heading record. The continuation is determined by analyzing the document formatting information (starting column of each line and number of blank lines after each record) from the parser data structure. The program then sets the colon record (if only one record was identified) or the last continuation record (J. Doe in this case) as the last record of a heading.

If no punctuation marks are found, the procedure looks for the same heading clues and also examines the context of the heading identifier using the parser syntactic properties. It checks to see if the record containing the heading identifier also contains at least one verb or article. If these are not found or they are found in the subject or reference statements, the program examines the document line for continuation the same way as it does for the identifier followed by punctuation, and sets the last heading record.

Finally, if a letter does not contain either the complimentary close or heading identifiers, the program examines the beginning of the document for the date on a separate line. If the date is found and the next line contains a verb, the program marks the end of the heading after the line containing the date as illustrated below.

---

8/5/85
Most applications which call TETERN will want the pos bits-letter codes are really only for external display. Let's take it out-what do you say
Mike

---

When a separate date line is not found, the procedure analyzes the document for the message line, created by a system, and if it is found, the message record becomes the only record in the document heading. The following example illustrates this type of a document.

---

MSG:002 08/08/85-17:12:14 A TO: YJGTE GCEGA1 FROM: RGEWMV RJF
    Janice, don't worry about resending any letters. Perhaps you can keep the problem in mind for the next time you send. We're just rookies out here in the plains, and we haven't mastered VM yet. So be patient. It was nice of you to reply.
                Dave Lingerman RGEWMV at RJF
                DEPT 42W/053-1
                Rochester, MN 8-321-5165

---

Otherwise, the document has no heading. Forty-two percent of the documents sampled contain salutation clauses. Eighty-nine percent of the documents consist of the identifiers in the heading portions. Only two percent of sampled documents did not contain the heading identifiers. The remaining nine percent of the documents were addressed as with no-heading format (BODY_ENDING discourse structure).

Pie Frame Interpreter Module and Pie Frame Expectations:

The goal of the PIE frame interpreter is to understand the meaning (semantics) of the text. However, before text can be analyzed for meaning it is necessary to analyze the text structurally and syntactically.

Manual analysis of the discourse structure of business correspondence data has yielded rules that govern the acceptability of referential terms in specific discourse situations. These clues encode knowledge to direct the programs to examine the locations within the discourse where co-referents (actual data) may be found.

Syntactic analysis, on the other hand, is concerned with the grammatical interpretation of text to determine the parts of speech of the words and phrase structure of the sentences.

The structural and syntactic information makes it possible to set up a framework of expectations to drive subsequent field-oriented text analysis. The parametric information extracted from the parser data structure is identified and stored in the standard formats in the form of frames. The frame module provides a set of expectations that have to be fulfilled in particular situations.

The expectations that we have for the Discourse Model of business correspondence document can be characterized with respect to the semantic components as well as to the syntactic and lexical entities. It is the latter that are used to fill the slots of the PIE frame. The expectations of the PIE Discourse Model for the document heading and ending are summarized in FIGS. 7 and 8.

The following Example 11 illustrates the heading portion of a document which contains some of the heading expectations.

---

Example 11

| | |
|---|---|
| Date: | 21 March 1984, 18:47:48 cet ACK |
| From: | OSBORNE BOB 37843250 at YKEWMT |
| | Phone: 00 39 2 536 2311 |
| | EJK 9423 |
| | Square Regina |
| | 8930 Brussels Belgium |
| To: | Mr. M. R. Dole DOLE at YJEMMT |
| cc: | Mr. R. Meyers RMEYERS at BTHEMES1 |
| | Mr. J. Brown THEMESS at HEHRNES1 |
| | Mr. G. Green THGEJWT at TUEHWMS1 |
| | Mr. J. P. Jameson PJAMESON at IEINC1 |
| | Mr. G. Barksdale OOTHEMSO at IEHTM1 |
| Subject: | New Assignment |

The Example 12 below illustrates the ending portion of a document containing some of the ending expectations.
Example 12

Best regards,
        Richard Morris
        Manager of Research & Development
        786 Cabin Road
        Newport, MI 48577 U.S.A.
        MORRIS at KEYBMT Tie line (876-9876)
        Phone (378) 986-3533
cc: CEHN-THOREMB
    THEIMUY-NEITHEB

---

Lexical and Syntactic Document Features:

The process of locating parametric information within a document uses structural (formatting) and grammatical information.

Let us consider, for example, some of the details concerning the identification of the addressee of a document. The first step is to look for key words (contextual criteria) that are highly characteristic of this field. The word "to" followed by a colon ("to:," "To:," "TO:") occurs with high frequency in certain types of documents. Whenever such key words are found, they simplify the task of locating the associated field significantly because they are unambiguous and easy to identify. However, the text surrounding such identifiers still needs to meet the syntactic requirements of the fields before the data is tagged for extraction by the mapping procedures. Analysis of the grammatical structure involves the examination of the syntactic role of the words (part of speech) and sentence structure. Application of the linguistic observation that business correspondence does not have complete sentences in the heading is used to locate prepositional phrases which are not associated with a verb. Such phrases are examined for the positions "to" or "from" to determine addressee and sender, respectively, of some types of correspondence.

In the absence of characteristic key words, emphasis is placed on grammatical structure and formatting clues. Since the subroutine NAMEX of the parser identifies personal names (see below, either the prepositional phrases or the position of the name within the heading of the letter is used to identify the name of the sender.

The positional criteria used to locate names are based on well-established business writing conventions. There are many variations for the document format (see Examples 6a-d, 7a-c, 8a-c, 9 and 10). The indentation can be different, or if business letterhead is used, the sender name and address may be omitted from the heading. However, these conventions are so well-established that with relatively simple examination of the contextual information it is possible to locate the sender and recipient of a business letter.

Contextual criteria are used by the HEADING and ENDING procedures (see flow charts in FIGS. 13 and 14) for the PIE frame slot identification of 10 different fields (as shown in FIG. 3).

Date Criteria:

The date of the letter is usually located in the heading of a document. This is why it is the responsibility of the HEADING procedure to identify the date for the date frame slot. As shown in FIGS. 7 and 8, date of the letter can be represented in one of the following forms:
DATE:
FEB. 29, 1984
FEBRUARY 1984
29 JUNE 1984
7/30/84
30/7/84
85/1/30
15.08.84

The HEADING procedure first examines the text for the contextual clue "Date:." If this is not found, it analyzes the document heading according to the occurrence of the month names and/or the specific number patterns which are characteristics for dates. The location of date information is passed to the mapping module for further processing.

Recipient Criteria:

The recipient information is usually located only in the heading of a document. The following identifiers are considered as recipient identifiers:
To:
TO:
To
TO ALL
Memorandum to
NAME→
Memo to:

The HEADING procedure identifies lines of the document containing recipient identifier, then checks the text following the identifier and passes the location of the data to the ISOLEXT mapping procedure to map and place the recipient personal name (or names) to the recipient frame slot.

Sender Criteria:

The sender information in the business correspondence document may be located in both the heading and ending components. First, the Heading procedure tries to identify the sender information by locating the following sender identifiers:
FROM:
From:
From
Name & Tie Ext.:
Message from:
Issued by:

The representation for the sender field follows the same format as that of the recipient. The HEADING procedure identifies the lines of the document containing sender identifier, then checks the text following the identifier and passes this information to the mapping procedure to locate the sender personal name (or names) to the sender frame slot.

If the sender information was not identified by the HEADING procedure, the ENDING procedure locates these identifiers in the ending portion of a document, and if the sender information is not found, the SIGNATURE module will assign the signature to the sender frame slot.

Carbon Copy Names Criteria

The carbon copy (cc) information may be located in either the heading or the ending portions of a document. The HEADING and the ENDING procedures examine both portions to locate the following identifiers:
CC:, cc:
CC., cc
cc. :
with cc
Also to
also to:
Copy to→
Copy to:
For information to:
To be forwarded to:

These identifiers are usually followed by personal names or userid/nodeid or both. The format of cc proper names is the sender and recipient. It may only be partitioned into sender, recipient, or cc slots on the basis of their identifiers. If the HEADING procedure cannot find cc information then the ENDING procedure tries to locate the cc identifiers and passes the information to the corresponding mapping procedure.

Userid/Nodeid Criteria

The userid/nodeid information may be considered as sender, recipient, or cc information respectively. The reason why the PIE system creates the separate frame slots for this information is to simplify user search either by personal name or by VNET information. Very often electronic mail documents (see Example 7a) do not contain sender and recipient personal names, but instead contain only userid/nodeid information. If the document contains all the sender and recipient information (personal names and userid/nodeid), the personal names will be assigned to the sender and recipient slots, and the userid/nodeid information also will be assigned to their corresponding frame slots. This is why the VNET identifiers are the same as the sender, recipient or cc identifiers. Sometimes VNET data may have different identifiers such as "VNET Address:" or "NETWORK address:". If those identifiers are found, the lines containing the data will be passed to the mapping procedures.

Userid and Nodeid may be located in either the heading or the ending. The HEADING and the ENDING procedures locate the userid/nodeid identifiers and pass them to the CHECKID mapping procedure to map and place data in the corresponding frame slots.

Address Criteria

The recipient and sender addresses also may be located in both portions of the document. There are not too many address identifiers.

Internal Address/or US Mail Address: Address:

The location of the address information followed by one of the address identifiers is passed to the address mapping routine. If the address identifier is not found, the location of the record (usually after the sender, recipient information or signature) is recognized and passed to the mapping module.

Title Criteria

The procedure of title identification is very similar to the address identification. The title identifies the function or position of a person, not the title of a document. There is only one title identifier found in business correspondence text.

Title/Dep. Name:

The title information is usually located in the heading of a document but it also may be located in the ending. The title identification is done mostly on the basis of title identifier and its location. If the title identifier is not found, the title location is checked after the sender, recipient, or signature records and passed to the mapping procedure.

Subject Criteria

The subject information is extracted for the subject frame slot only if the document contains a subject statement with one of the following subject identifiers.

Subject:
Subject→
Subj:
Subject

The subject information is located only in the heading of a document. The HEADING procedure defines the subject information for the subject frame slot only if one of the subject identifiers is found. It stores the subject records followed by the subject identifiers for the subject frame slots.

Reference Criteria

The reference identification procedure is very similar to the subject identification. It is done only on the basis of recognition of one of the reference identifiers in the heading of a document:

Re:
Reference→
Ref.:
Reference

The HEADING procedure looks for one of the reference identifiers to assign the reference records to the reference frame slot. All identifiers may appear in either capital or lower case letters.

Personal Name Identification Procedure (NAMEX)

The NAMEX program identifies personal names in free text. The automatic identification of personal names in natural language text has many applications in office systems. One very useful application is the extraction of names from office correspondence to automatically create index entries for the sender and addressee of a document. NAMEX is a computer program that provides this support.

The strategy of NAMEX is to start from an upper case word and to scan to the right until a delimiter or non-name word is found. The words that can be names or initials are analyzed positionally and morphologically and placed in a word characterization table. This table is examined systematically based on word characteristics, context, and specialized dictionaries containing geographical entries and personal titles to decide whether a proper name has been found. When the program decides that it has found a proper personal name, its boundaries are marked and control is returned to the calling program.

The Word Characterization Table

The first stage used to identify personal names automatically is the creation of a table that summarizes the attributes of the text. This table is known as the word characterization table and contains syntactic, lexical, morphological, contextual, and positional information for each word. The SYNTACTIC information indicates the part of speech, the LEXICAL information indicates whether the word has been found in a dictionary and whether it is an abbreviation. The MORPHOLOGICAL information contains word length, capitalization format indicating if the word is all lower case, leading upper case, or all upper case, and whether the word contains imbedded numerics, hyphens, or apostrophes. The CONTEXTUAL information consists of the delimiter which follows each word plus the next two characters. In addition, global context switches indicate whether mixed case words occur in the environment of the name. The POSITIONAL information indicates the location of the word with respect to a line of text (first word, last word) and distance separating words.

The word characterization table is built by scanning each text word until a delimiter or a word that cannot be part of a name is found. Words are added to the table based on contextual clues. For example, if the first word is preceded by the prepositions "to," "by," "for," "from," or "with," a flag is set to alert the program about a possible name. Similarly, the program stops building the table and goes to the next stage of analysis when it encounters consecutive punctuation characters, punctuation other than periods, numeric strings, lower case words, abbreviations, and words with parts of speech such as determiners, prepositions, conjunctions, pronouns and auxiliaries.

At some stages during the construction of the word characterization table, it is necessary to remove entries which have been previously added to it. The month names "May," "June," and "April," for example, can also be names for persons and cannot be eliminated until a numeric is found after them.

Certain lower case words are incorporated into the table because they frequently occur in Spanish, German, and Dutch names. These words include "de," "la," "von," "van," and "der." Additional criteria limit the kinds of words that are allowed in the table. Thus, words with apostrophes which are not possessive ('s) are required to have at least two upper case letters (e.g., O'Korn, D'Angelo). Words with hyphens are required to have an upper case letter following the hyphen and each segment of the hyphenated name must have more than three letters. This eliminates spurious entries (X-Rays, Pre-natal, etc.) from getting into the table. Mixed case words cannot have more than two upper case letters (e.g. EuroHONE, VNETed are rejected, but MacNeil, O'Hara are OK).

Table Analysis Procedure

The procedure that builds the word characterization table screens many invalid name forms but since it uses mainly morphological clues it is not sufficient for satisfactory results. The table analysis procedure uses lexical and contextual criteria that act as powerful filters for the recognition of personal names. The analysis procedure first tags words that belong in a name and then in a second stage reviews whether the components of the name make sense before concluding that a name has been found.

In the first stage, single letter abbreviations are assumed to belong in the names; other words have to meet strict requirements. If the word is followed by a period and it is the abbreviation of a personal title (e.g., Mr., Mrs., Rev.) an alert is signaled. Otherwise the word may be a known abbreviation, an abbreviation not known to the system, or the last word of a sentence. Abbreviations known to the system are name delimiters and force the start of the second stage of analysis.

The identification of personal titles provides an important clue about the words that follow. For this reason the program looks for titles that reflect job position (Chief, Mayor, Judge, Professor), family relation or ecclesiastical rank (Father, Sister, Bishop) royal rank (Sir, Esquire, Countess), military rank (Colonel, Admiral, Commander), or civil status (Miss, Mrs.). The word "Dear" itself is also interpreted by the program as a clue about the imminent appearance of a name. Many of the words of this type are marked in the Longman Dictionary of Contemporary English with an "A" code indicating that the word may be used before a noun; although this dictionary was consulted, the words used by the program have been screened to remove those that do not identify personal names.

Words are checked also to see if they do not belong in names. Such words are called "stoppers" because they stop the processing and force the start of the second phase. Words in this class are the days of the week (Monday, Tuesday, etc.), the names of the months except for the three mentioned earlier, all noun forms having more than seven characters and ending in "ment" or "tion," and words that indicate conglomerates (e.g., School, Corporation, Society, Company, Association, District, National) or directions (e.g., North, East, Boulevard). Geographical that cannot be personal names are also "stoppers." Thus, "Brazil," "Norway," and "Alaska" are in the geographical stopper list, but names like "Austin" and "Houston" which are geographical locations that have been given personal names are not on this list. Words that are fundamentally adjectival are also considered stoppers (e.g., Olympic, Atlantic).

Complications arise if a word is all upper case because it can mean that all the text is in upper case (as in a telegram) or that the word is an acronym. For such cases the program relies heavily on previous clues such as personal titles and punctuation to make a decision, but additional checks are performed to see if the overall context of the word has any lower case letters. A word that is all upper case in the middle of a mixed case environment is considered by acronym. In addition, if an all upper case word is less than five characters long it is considered an acronym (e.g., ABC, NATO) unless it is preceded by "Mr.," etc. However, an all upper case word is accepted as part of a name if it is preceded by an initial or if it is the last word of the line or of the sentence.

NAMEX uses lexical information by checking the type of match obtained against the dictionary. If a word is not found in the dictionary and the word is capitalized, it is assumed to be a name although there is a possibility that the word could be a misspelling or it could be a rare capitalized word. However, a capitalized word that ends in period and consists of four or fewer characters is considered an abbreviation if it occurs as the first word of a name.

If a word matches against an entry which is stored in upper case in the dictionary, the name is a proper name. If the word is capitalized, but it matches against a word that is stored in lower case in the dictionary, then we have to check for special cases such as "Bill," "Frank," "Grace," "Grant," "Sue," and others which can be English words and proper names.

These proper names that can also be ordinary English words need to be resolved based on personal titles or punctuation clues (e.g., Mr. Brown, Dr. K. White, From: J. Reed). Other heuristic rules are used in the absence of these clues. A word is considered a name, for example, if the preceding word was recognized as a name (not an initial) and the program has not accumulated three words for the name. Discourse format rules are also used, so that if we have initials and they are at the beginning of a line or they are tabbed, then the word that follows them is a name. Criteria such as the above help to differentiate between names and non-names like "Harold White" and "U.S. District Attorney." Some lower case words are allowed in names, particularly for Spanish, Dutch, and German names as mentioned earlier.

NAMEX executes a second pass over the word characterization table taking inventory to make sure that the words that have been tagged in the table can be interpreted as personal names. For example, if only initials have been marked (e.g., U.S.O.) then a personal name has not been found. Similarly, a single, all upper case word is more likely an acronym than a name. Additional checks look beyond the name for contextual clues. For instance, a numeric may not precede a personal name (e.g., 41 S. Broadway, 201 Perry Parkway). The prepositions "in" and "on" are also not allowed before personal names because they typically refer to inanimate entities (e.g., in Atlanta, on Telenet). If the name has more than two words and the last two are in the dictionary in lower case, then it is unlikely that we have a name (e.g., Datastream Interpreter Extensions). Finally, if the name ends in comma, a check is made to see if what follows is a state abbreviation that indicates a geographical location (e.g., Boca Raton, Fla.).

Pie Frame Slot Identification Procedures

Once the heading and ending of a document have been identified, the frame procedures HEADING and ENDING are applied. These procedures analyze each record in the heading and ending of a document marked by the HEADDOC and END_DOC procedures looking for syntactic, lexical, and morphological expectations either in upper case or lower case (see FIGS. 7 and 8) to define the location of data for the specific frame slots that need to be processed by the mapping procedures.

Heading Procedure

Figure 13:
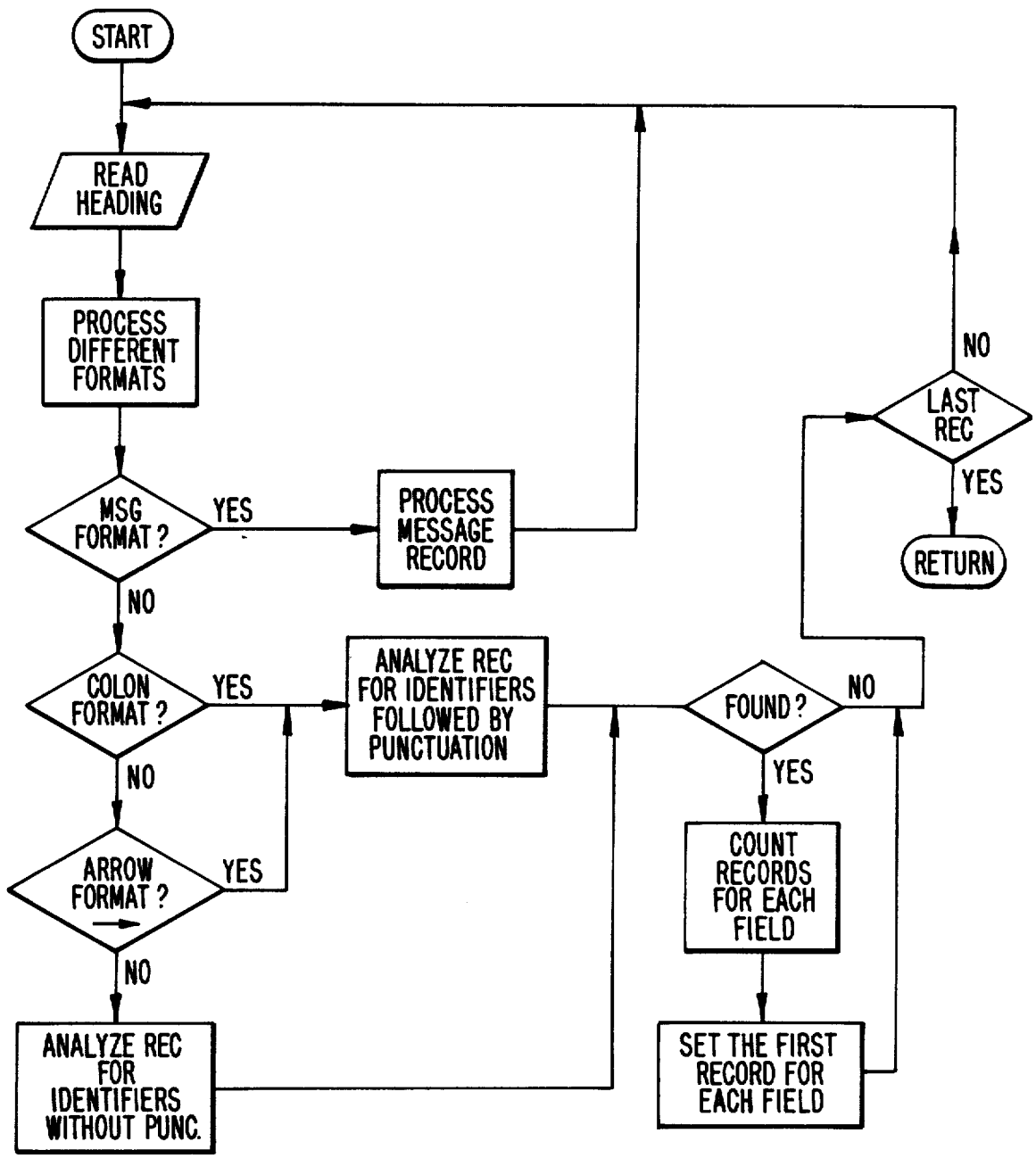
FIG. 13 is a flow diagram of the HEADING program which extracts parametric fields from a heading.
Figure 14:
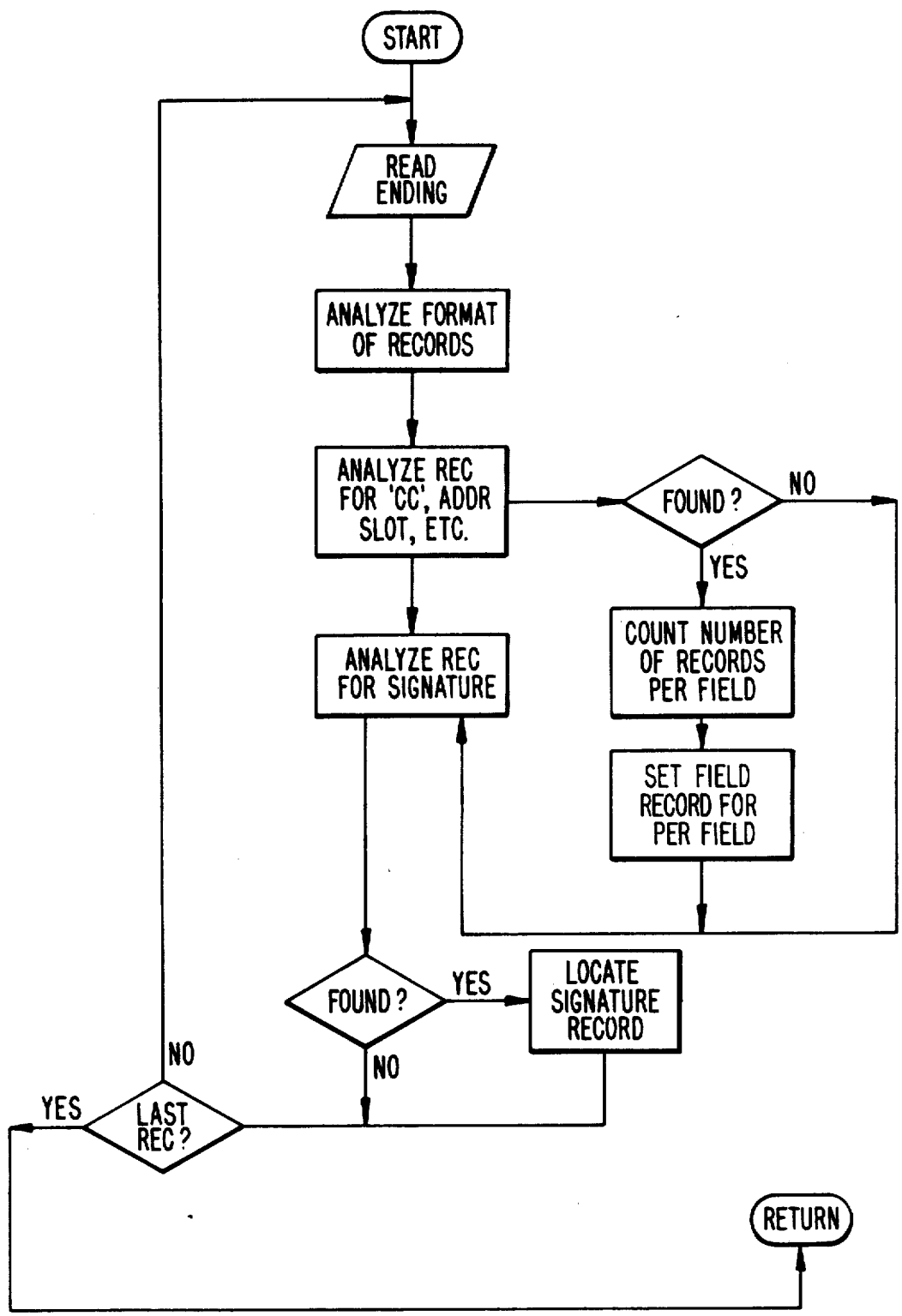
FIG. 14 is a flow diagram of the ENDING program which extracts parametric fields from an ending.

The HEADING procedure of FIG. 13 is more complicated than the ENDING procedure of FIG. 14 because it has to process more information, such as the subject of the document, reference to previous correspondence, addresses, dates, etc. It scans each record in the heading of the document marked by HEADDOC, and extract words and their property supplied by the parser for their examination to recognize the location of data which will later be passed to the mapping procedures to fill the corresponding frame slots. For example, to identify the sender information the program looks for such word-clue as "From:" or "NAME & TIE/EXT.:", then it checks the text surrounding (prepositional phrase, personal name, no verbs, no articles, etc.) to find out if the data meets the sender requirements. After the data is identified, it checks how many document lines belong to the data. Eventually, the procedure stores the location of the data and a count of the lines for this information.

Ending Procedure

The ENDING procedure is similar to the HEADING procedure. The ENDING procedure locates the name of the person who signed the letter, carbon copy list, date, and other information that may be found in the ending. The ENDING procedure tries to avoid duplication of effort by checking to see if the needed information has already been extracted from the heading of a document. If it has, then the program simply returns to the calling program without scanning the text.

Pie Mapping Module and Semantic Mapping of the Parametric Information

Semantic mapping is the second stage of the parametric field extraction process. It also requires structural and grammatical information but, in addition, uses formal syntactic descriptions of the data to be extracted to ascertain that its format meets our presuppositions.

The structural information used by the semantic mapping complements that used during the identification of the fields, and the formal syntactic descriptions insure that only the data that is appropriately recognized is placed into the slots of the output frames. The syntactic descriptions, in essence, act as "clean up" filters that standardize the format of the data selected.

Development of a formal description of text requires analysis of a substantial amount of text to produce an accurate and comprehensive description.

Figure 15:
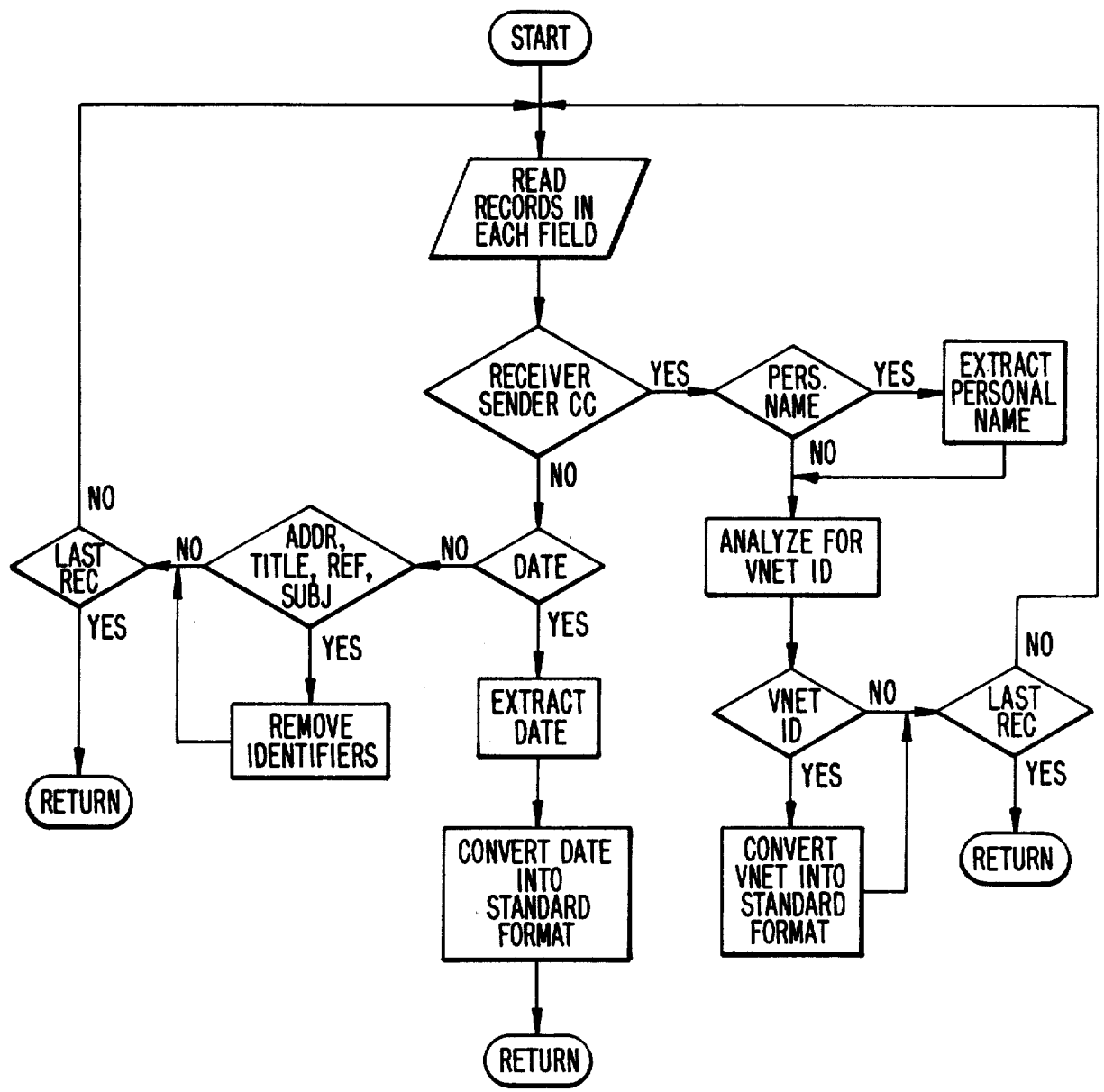
FIG. 15 is a flow diagram of the ISOLEXT program which creates a frame of parametric fields.

Mapping the text into semantic representation (frames) is done by the ISOLEXT procedure (see flow chart in FIG. 15). The mapping procedures are not concerned with the identification of the fields; their function is the recognition of data and the placement of the data into the appropriate slots.

The ISOLEXT mapping procedure examines each record passed to the corresponding frame slots and maps the data in the standard format as required by the document retrieval system.

DATE format is in the form of YYMMDD, where YY is the year, MM the month, and DD the day.

SENDER, RECIPIENT, and CC frame slots include only a personal name (or several personal names separated by commas).

VNET slot is in the form USERID@ NODEID.

Other parametric information requirements can be established for the document retrieval system.

The ISOLEXT procedure recognizes slot information using its syntactic and morphological patterns, restructures data for uniformity, and converts it to the standards for the document retrieval system.

Date Field Mapping

Figure 9:
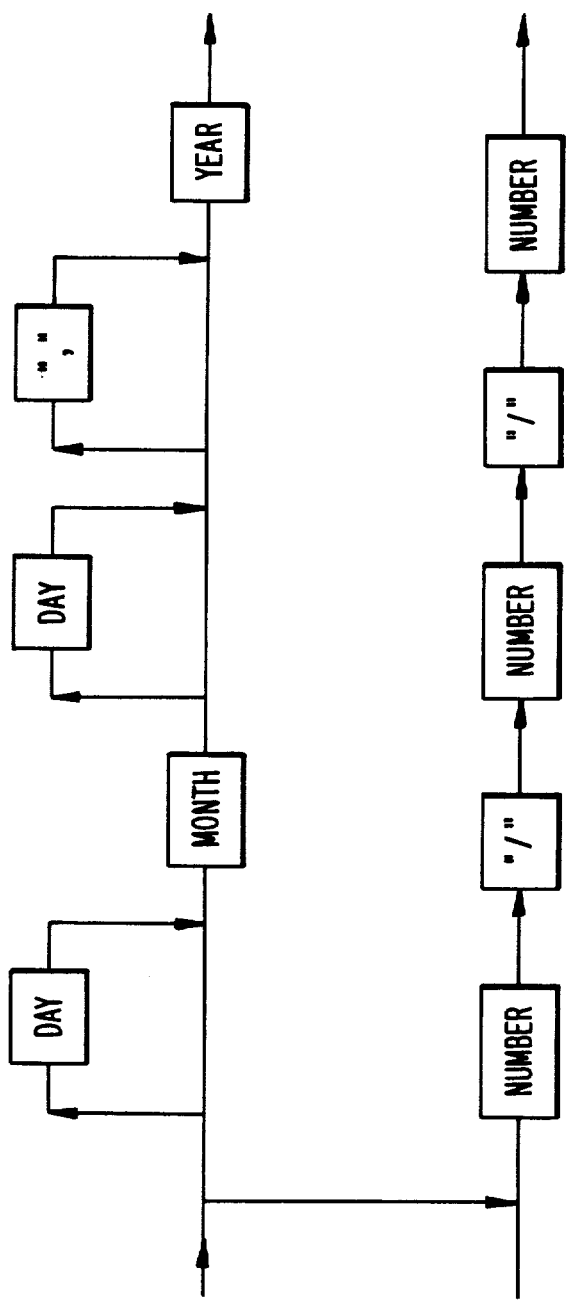
FIG. 9 is a data flow diagram of the date syntax.

The date criteria description and the date of the document may be represented as month followed by day, followed by comma, and followed by year (MONTH, DAY, YEAR—FEB. 29, 1984), or month followed by year (no day) (MONTH, YEAR—FEBRUARY 1984), or day followed by month and followed by year (DAY, MONTH, YEAR —29 JUNE 1984), or other numbers separated by slashes or by periods (NUMBER/NUMBER/NUMBER (M/D/Y)—7/30/84, (NUMBER/NUMBER/NUMBER (D/M/Y)—30/7/84, NUMBER/NUMBER/NUMBER (Y/M/D)—85/1/30, NUMBER.NUMBER.NUMBER (D.M.Y)—15.08.84). The syntax diagram in FIG. 9 is applied for the date slot recognition.

The date mapping procedure examines the record marked by the HEADING procedure for the patterns corresponding to the syntax representation given above. Some common pathological cases such as "May 17,1985," without space after the comma are also handled. After the date is isolated, the mapping date subroutine is used to interpret the contents of the subfields to generate a date in the standard form YYMMDD (year, month, day). Standardization of the date is very important, particularly for numeric dates separated by slashes since they may occur in European (day/month/year) and American (month, day, year) formats. The date mapping module differentiates between these formats on the basis of the numeric values. Numbers less than 13 may represent day or month, numbers greater than 12 and smaller than 32 can only represent days. Numbers 32 or greater are considered to be the year. If both the day and the month are smaller than 13, the date is assumed to be in American format. By applying the constraints implied by these rules, dates can be mapped into the standard format. For example, if date in the document is Feb. 19, 1986, it will be converted to 860219.

Recipient, Sender, and cc Fields Mapping

The recipient, sender, and cc information may be represented in the document in any of the following formats:

TO: Dave Glickman
TO: GBGSECl-YKTVMT ROSENBAUM WALTER
TO: W. S. ROSENBAUM
TO: EMZ
TO: Elena
TO: Mr. Antonio Zamora (301-921-6133 ZAMORA at YKTVMT)

TO: Mr. W. Rosenbaum
TO: Dr. K. Engelke, egl at sdvm
TO: Managers
TO: John Cameron Raleigh, NC
FROM: Walter S. Rosenbaum
CC: KWB—YKTVMT Ken Borgendale
cc: Gail M. Adams The names may appear without capital letters. The description of personal names was done on the basis of extensive data analysis. The syntactic patterns for names are the following: (1) the first name followed by the last name (Elena Zamora),(2) only the first name (Elena),(3) only the last name (Zamora),(4) initials followed by the last name (E. M. Zamora),(5) the first name followed by the middle initial, followed by the last name (Elena M. Zamora), and (6) the first name followed by the middle name, followed by the last (Elena Michelle Zamora).

The procedures for addressee, sender, and cc information scan the corresponding records for proper names identified by the parser (see description of the NAMEX parser proper name identification above) and then verify if the proper name is a personal name using the syntactic description and formatting and morphological criteria. The information is then placed in the corresponding frame slots. Although there is some redundancy between the criteria applied by the parser and the name mapping procedure, the latter makes use of formatting criteria, morphological characteristics and other contextual clues specific to the business correspondence domain which cannot be applied by the parser because of its more general nature.

Neither sender nor recipient information may be explicitly identified by identifiers in the business letter format. For this type of format this information may be extracted only on the basis of the location of personal names in the document. Usually sender and recipient personal names in this type of a document are located in the leftmost corner of the heading. If the document contains a signature, one of these names is matched with the signature, then the signature is placed in the sender frame slot, and the remaining name is placed in the addressee slot. If personal names are not found, the slots will be empty.

Userid/Nodeid Field Mapping

The USERID/NODEID information has the same identifiers as the SENDER, RECIPIENT, and CC data. They may occur in the same line with the personal names in the sender, recipient and cc data, or on the different lines with different identifiers (see the sender, recipient and cc examples above). Sometimes they do not have any identifiers. The representation of the userid/nodeid information is shown in the example below.
HUGHW-STAMIPS
GBGSEC5(YKTVMT)
GBGSEC1 at YKTVMT
EMZ
YKTVMT GBGSEC1
GBGSEC1 YKTVMT The syntactic patterns that the program uses for the userid/nodeid information are the following:

(1) userid followed by slash followed by nodeid (HUGHW--STAMIPS), (2) userid followed by left parenthesis followed by nodeid followed by right parenthesis (GBGFSEC5(YKTVMT)),(3) userid followed by the preposition "at" followed by nodeid (GBGSEC1 at YKTVMT), (4) only userid (EMZ), (5) userid followed by nodeid (YKTVMT GBGSEC1), and (6) nodeid followed by userid (GBGSEC1 YKTVMT).

The USERID/NODEID mapping procedure examines records passed to the VNET ID's frame slots using structural, morphological and syntactic patterns. Sometimes, it is very difficult to distinguish the USERID and NODEID information. In the message format records this information may be represented in one of the following forms:
MSG:0001  05/15/84—17:57:08  To:  YKTVMT GBGSEC1 From: IECVM1
MSG:0001  05/15/84—17:57:08  To:  GBGSEC1 YKTVMT From: IECVM1

The mapping procedure applies the node morphological characteristics such as 'vm±, 'hon', 'ykt', 'atl', 'avs', 'bcr', 'bet and 'bld' and identifies YKTVMT as a nodeid in both cases. Morphological patterns have been generated by the analysis of example company system nodes. The length of the node information is also restricted. It cannot be less than four characters or more than eight characters. After the userid and nodeid are recognized respectively, the ISOLEXT procedure converts them into a standard format (USERID@ NODEID) placing the userid information always first.

Address, Title, Reference, and Subject Fields Mapping

The following examples illustrate address, title, reference and subject representation in the business correspondence document.
Address: 10-B-2/Gaithersburg, Md. 20877 201 Perry Parkway
Address: 360 Hamilton Ave., White Plains
Address: Centro Scientifico di Pisa Via Santa Maria 67 Pisa, Italia
Title: UK Representative, International Sales WTC
Title: Applications Division Manager
Title: Manager of Linguistic Development
Subject: Dictionary Problems
References:-Negotiations and tentative agreements/attachments —Your VNET-answers of May 11 and May 14

The syntactic description of the address may include (1) number followed by the street name, followed by the name of the city, followed by the name of the state, and followed by the zip code, or (2) name of the city followed by the name of the state, followed by the zip code, followed by the number, followed by the street name, or (3) name of the company, followed by the name of the street, followed by the number, followed by the name of the country, followed by the name of the city.

The address information followed by one of the address identifiers is extracted and placed in the address frame slot by the address mapping routine. If the address identifier is not found, the search for the address information is done on the basis of the address syntactic description.

The title mapping is similar to the address mapping; it uses title syntactic patterns when the title identifier is omitted. The subject and reference information is placed in the corresponding frame slots by removing their identifiers from the data. Because there are no standard format requirements for address, title, reference, and subject fields, this information is extracted from the document by selecting specific portions of the lines associated with the appropriate identifiers, or on the basis of their syntactic patterns. Extraneous punctuation and trailing delimiters are also removed from these fields.

Document Retrieval System Operations

Figure 16:
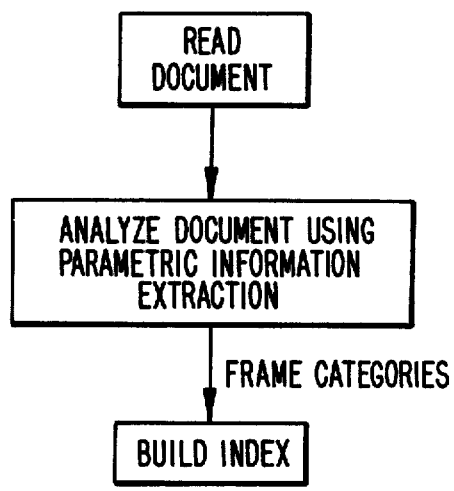
FIG. 16 is a flow diagram illustrating the operation of entering a document identification into a data base.

The following briefly describes the operations of document retrieval, making use of the parametric information extraction system, in accordance with the invention. FIG. 16 illustrates a flow diagram of the overall operations involved in entering a document identification into a data base. The document must be read and a document identification number assigned to it. The text of the document is then analyzed using the parametric information extraction in accordance with the invention. The frame corresponding to the document being analyzed has its frame slots filled with the applicable categories listed in FIG. 3. For example, if a business letter has been read in, and a document number has been assigned, the corresponding frame constructed by the parametric information extraction system invention will isolate the date of the letter, the name of the recipient, and the other items listed in FIG. 3, as applicable. Those identified categories will be entered into the frame corresponding to the document number. The program then transfers to the stage of building an inverted file index. Several approaches can be taken to building the index, for example separate indices can be constructed for each of the respective 10 categories in the frame, as enumerated in FIG. 3. An inverted file date index can be constructed, entering the date of the letter and the corresponding document number. If other business correspondence has been previously entered into the date index having the same date as the current letter being analyzed, then the current document number is merely concatenated to the previous document numbers associated with the particular date in the index. A second inverted file index can be constructed based upon recipient name and the name of the recipient for the current business correspondence being analyzed can be entered into that index along with its corresponding document number. Alternate approaches to building an inverted file index can be taken, for example a single index can be constructed with each entry including fields for the document number and the frame category within which the particular key word appeared for the corresponding document. The resulting inverted file indices will be a collection of key words and the corresponding document numbers within which those key words have been found and an indication of the frame categories for the key word in a respective document.

Figure 17:
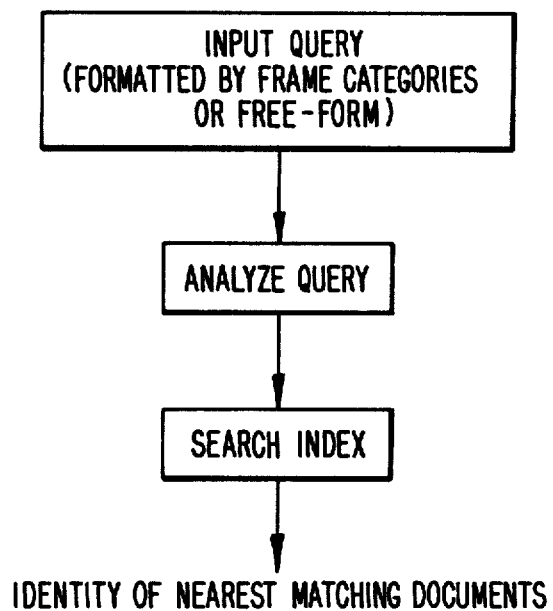
FIG. 17 is a flow diagram illustrating inputting a query in order to retrieve a document identification from a data base.

FIG. 17 illustrates a general flow diagram for inputting a query to a data retrieval system constructed in accordance with the invention, to retrieve a document identification. The first step accepts the input of a query which can be in the form of a non-formatted sequence of query words or alternatively which can be a formatted query with query words corresponding to respective ones of the frame categories enumerated in FIG. 3. For ease of explanation, the formatted query in accordance with frame categories, will be described here. In the next step, since frame categories such as subject statement or reference statement may not be phrased in a manner identical to the form in which they were analyzed when building the index, the query analysis can include linguistic processes for eliminating language and format dependencies, identifying synonyms and placing expressions such as dates in a standard form. In the case of synonyms for query words in a subject statement category, the synonyms for the respective query words can be listed in a set corresponding to the frame slot category for subject statement, which can be output to the search index step. In the search index step, the inverted file index for the particular frame category is searched to determine a match between the query word (and its synonyms) and the target words in the index. When a match is identified, the corresponding document number is noted. After all of the query words and the synonyms for the particular frame slot category have been searched in the inverted file index corresponding to that frame slot category, the resultant document numbers for the matched terms can be ranked in the order of their frequency of occurrence in the search operation. This results in a list of document identifications ranked in descending order of probability that they identify the document sought to be retrieved by the user. A separate document identification table can be maintained correlating document numbers with document citations, document titles, document locations or other identifying attributes of the documents.

In this manner, business correspondence can be indexed and retrieved in a more efficient and reliable manner than has been available in the prior art.

FIG. 18 illustrates an example of an inverted file index constructed with the Parametric Information Extraction (PIE) frame categories as part of each entry into the index. The index would be constructed for storage on an associated disk drive or other bulk storage device to be read and stored in the random access memory of the computer running the document retrieval program. In the example shown in FIG. 18, the example documents in Examples 6a, b, c and d have been compiled into an inverted file index using six of the frame categories, namely date, to, to VNET, from, cc, and subject for each document, as applicable. Although the inverted file index organization shown in FIG. 18 has key words organized under the same frame category, other inverted file index organizations can be employed where the frame categories are intermixed and the order of key words can be determined by hashing algorithms or other techniques. An important feature of an inverted file index wherein key word entries include a designation of the frame category produced by the Parametric Information Extraction process in accordance with the invention, is that it enables the rapid and reliable matching of queries constructed to access the typical parameters of business correspondence such as the date of the document, the addressee, the carbon copy list, and other parameters.

Although a specific embodiment of the invention has been disclosed, it will be understood by those having skill in the art that minor changes can be made to the embodiment of the invention disclosed, without departing from the spirit and the scope of the invention.

What is claimed is:

1. A computer method for the automatic extraction of commonly specified information from a business correspondence document, such as date of letter, name of recipient, name of sender, address of sender, title of sender, carbon copy list, subject statement, and the like, comprising the steps of:

a first scanning step of scanning the input data stream to locate postscripts, attachments of appendices at a first location by matching each word from the input data stream against a list of expressions used to indicate postscripts, attachments of appendices, said first location being set equal to the final occurring line in said data stream if said first scanning step does not locate any postscripts, attachments or appendices therein, said first location alternately being set equal to a location of postscripts, attachments or appendices found in said first scanning step;

a second scanning step of scanning the input data stream to locate the final sentence in said document, starting from said first location and scanning toward the beginning of said data stream, searching for words which are verbs in the final sentence in said document, by identifying the last occurrence of a verb in the input data stream, which will occur in the final sentence of said document;

a first identifying step of identifying an ending portion of the document expected to contain a sender's name, return address, title of carbon copy list information, at a location in the input data stream occurring after the end of said final sentence located in said second scanning step, and occurring before said first location located in said first scanning step;

a third scanning step of scanning said input data stream to locate any salutation by matching each word from the input data stream against a list of natural language expressions that can be used as a salutation;

a second identifying step of identifying a beginning portion of the document at a location which includes a portion from the start of the input data stream to the end of a salutation, if a salutation was located in said third scanning step;

a fourth scanning step of scanning the input data stream if no salutation was found in said third scanning step, said fourth scanning step to locate date, addressee, sender, return address, personal title or subject information in the input data stream by matching each word of the input data stream against a list of expressions that are used to indicate the date, addressee, the sender, the return address, personal title and the subject of the correspondence document;

a third identifying step of identifying, if no salutation was found in said third scanning step, a beginning portion of the document at a location which includes the date, addressee, sender, return address, personal title or subject information of the correspondence document located in said fourth scanning step;

isolating and storing from said beginning portion of said document, any addressee, sender, return address, personal title or subject information therein;

isolating and storing from said ending portion of said document, any sender, return address, title or carbon copy list information therein.

2. A computer method for the automatic extraction of commonly specified information from a business correspondence document, such as date of letter, name of recipient, name of sender, address of sender, title of sender, carbon copy list, subject statement, and the like, comprising the steps of:

a first scanning step of scanning the input data stream to locate postscripts, attachments or appendices at a first location by matching each word from the input data stream against a list of expressions used to indicate postscripts, attachments or appendices, said first location being set equal to the final occurring line in said data stream if said first scanning step does not locate any postscripts, attachments or appendices therein, said first location alternately being set equal to a location of postscripts, attachments or appendices found in said first scanning step;

a second scanning step of scanning the input data stream to locate the final sentence in said document, starting from said first location and scanning toward the beginning of said data stream, searching for words which are verbs in the final sentence in said document, by identifying the last occurrence of a verb in the input data stream, which will occur in the final sentence of said document;

a first identifying step of identifying an ending portion of the document expected to contain a sender's name, return address, title or carbon copy list information, at a location in the input data stream occurring after the end of said final sentence located in said second scanning step, and occurring before said first location located in said first scanning step;

a third scanning step of scanning said input data stream to locate any salutation by matching each word from the input data stream against a list of natural language expressions that can be used as a salutation;

a second identifying step of identifying a beginning portion of the document at a location which includes a portion from the start of the input data stream to the end of a salutation, if a salutation was located in said third scanning step;

a fourth scanning step of scanning the input data stream if no salutation was found in said third scanning step, said fourth scanning step to locate date, addressee, sender, return address, personal title or subject information in the input data stream by matching each word of the input data stream against a list of expressions that are used to indicate the date, addressee, the sender, the return address, personal title and the subject of the correspondence document;

a third identifying step of identifying, if no salutation was found in said third scanning step, a beginning portion of the document at a location which includes the date, addressee, sender, return address, personal title or subject information of the correspondence document located in said fourth scanning step;

isolating and storing from said beginning portion of said document, any addressee, sender, return address, personal title or subject information therein;

isolating and storing from said ending portion of said document, any sender, return address, title or carbon copy list information therein;

storing said document in a file accessible by any addressee, sender, return address, title, subject information, or carbon copy list information.

* * * * *